United States Patent
Merriam et al.

(10) Patent No.: US 6,525,868 B2
(45) Date of Patent: Feb. 25, 2003

(54) SYSTEM AND METHOD FOR GENERATING COHERENT RADIATION AT VACUUM ULTRAVIOLET WAVELENGTHS USING EFFICIENT FOUR WAVE MIXING

(75) Inventors: Andrew J. Merriam, San Francisco, CA (US); James J. Jacob, Aptos, CA (US)

(73) Assignee: Actinix, Soquel, CA (US)

( * ) Notice: Subject to any disclaimer, the term of this patent is extended or adjusted under 35 U.S.C. 154(b) by 0 days.

(21) Appl. No.: 09/886,201

(22) Filed: Jun. 20, 2001

(65) Prior Publication Data

US 2002/0036820 A1 Mar. 28, 2002

Related U.S. Application Data

(60) Provisional application No. 60/212,730, filed on Jun. 20, 2000.

(51) Int. Cl.[7] ............................. G02E 1/35; G02E 2/02
(52) U.S. Cl. ........................................ 359/326; 359/330
(58) Field of Search .............................. 372/21, 22, 55, 372/56; 359/330, 326, 328

(56) References Cited

U.S. PATENT DOCUMENTS 4,091,290 A * 5/1978 Bjorklund et al. ......... 307/88.3
4,128,772 A * 12/1978 Chang et al. ............... 307/88.3
5,848,079 A * 12/1998 Kortz et al. .................. 372/22

OTHER PUBLICATIONS

Suganuma, et al., "157–nm Concerent Light Source as an Inspection Tool for $F_2$ Laser Lithography," Optics Letters, Jan. 1, 2002, vol. 27, No. 1, pp. 46–48.

* cited by examiner

*Primary Examiner*—Paul Ip
*Assistant Examiner*—Davienne Monbleau
(74) *Attorney, Agent, or Firm*—Fenwick & West LLP

(57) ABSTRACT

A nonlinear optical mixer produces coherent vacuum ultraviolet radiation. A cell contains a gas mixture of xenon and a phase-matching gas. A pump laser beam selectively excites the two-photon transition in the xenon gas. A mixing laser beam is also directed towards the gas mixture. Coherent vacuum ultraviolet radiation is produced by four wave mixing of the pump and mixing laser beams. The phase-matching gas, for example mercury vapor, is used to achieve phase matching of the four wave mixing. The coherent vacuum ultraviolet radiation preferably has a wavelength of approximately 157.6 nm (the molecular fluorine line) or 121.6 nm (the Lyman-α hydrogen line). In a preferred embodiment, the two laser beams are loosely-focused.

34 Claims, 17 Drawing Sheets

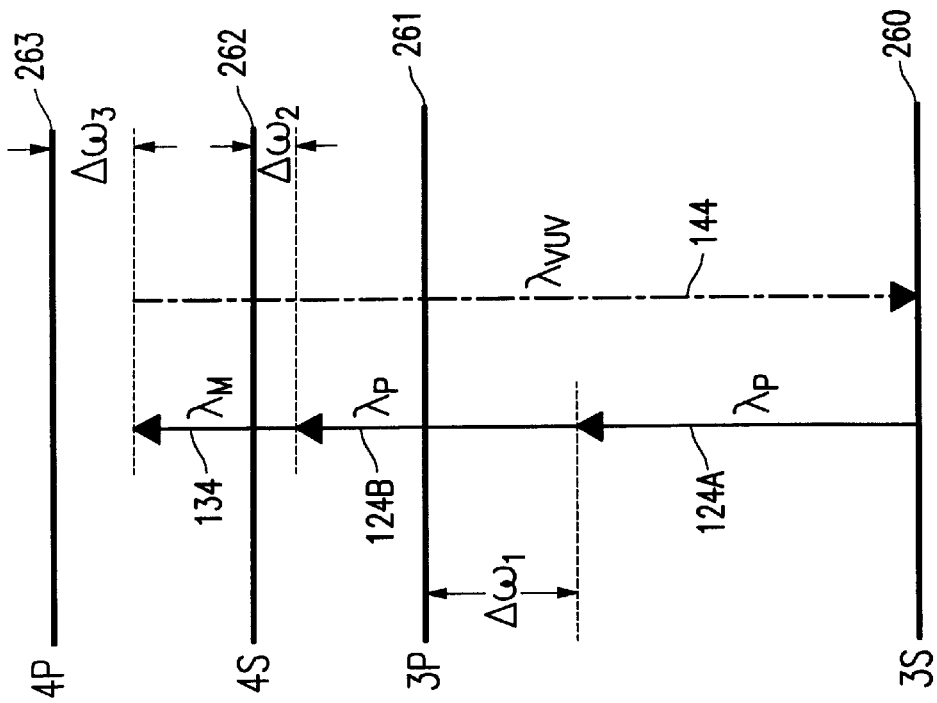
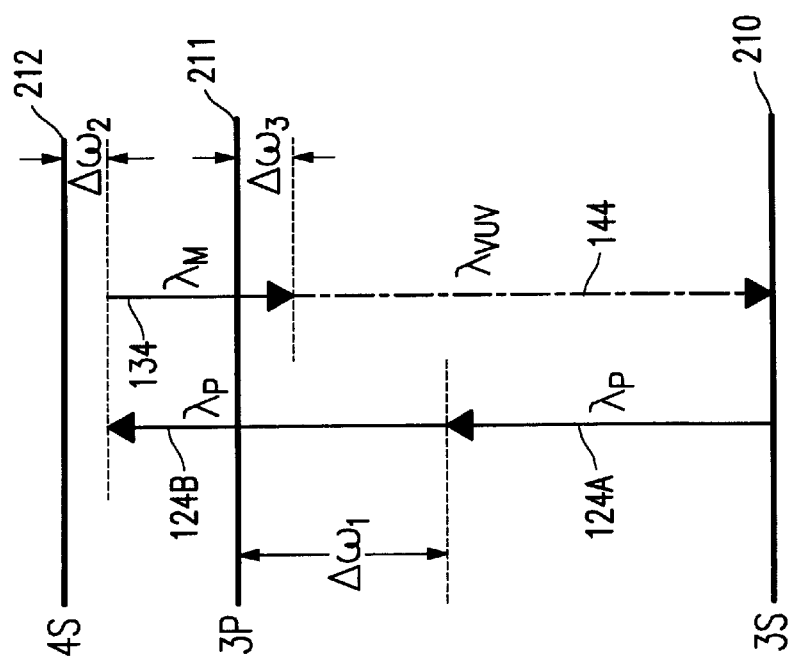
FIG. 2B
FIG. 2A

SYSTEM AND METHOD FOR GENERATING COHERENT RADIATION AT VACUUM ULTRAVIOLET WAVELENGTHS USING EFFICIENT FOUR WAVE MIXING

CROSS-REFERENCE TO RELATED APPLICATION

This application claims the benefit of U.S. Provisional Patent Application Ser. No. 60/212,730, "Efficient Vacuum Ultraviolet Light Source," by Andrew J. Merriam and James J. Jacob, filed Jun. 20, 2000, which is incorporated herein by reference.

BACKGROUND OF THE INVENTION

1. Field of the Invention

This invention relates generally to optical systems for producing coherent, vacuum ultraviolet (VUV) radiation. More particularly, it relates to approaches for generating coherent VUV radiation in the vicinity of the molecular fluorine line (157.63 nm) or the Lyman-α hydrogen line (121.57 nm) using efficient, phase-matched, two-photon-degenerate four-wave mixing.

2. Description of the Related Art

As technology progresses, there is an increasing demand for ever more powerful integrated circuits or, equivalently, a demand to include ever more circuitry into silicon chips that form integrated circuits. The result is that the circuits are reduced to ever smaller dimensions, requiring that ever finer features must be patterned during the manufacturing process. In order to meet this demand, the microlithography tools which are used to pattern such fine features have also been required to operate at ever shorter wavelengths, with the most recent generation of tools moving toward lasers that produce radiation beams with wavelengths in the ultraviolet region of the electromagnetic spectrum. Specifically, the argon fluoride (ArF) laser is commonly used to produce radiation at a wavelength of 193 nm, representing the currently available technologies. The favored candidate for next generation lithography is the molecular fluorine ($F_2$) laser, which produces radiation in the vacuum ultraviolet (VUV) region of the electromagnetic spectrum, specifically at 157.63094 nm. A possible successor to the $F_2$ laser is a VUV source which operates at the Lyman-α wavelength of atomic hydrogen (or its isotopes deuterium and tritium), approximately at 121.57 nm.

The technological challenges in transitioning from current to next generation lithography are many. The optical designs for state-of-the-art stepper platforms are complex and require the precise testing and alignment of many large focusing optics. High-energy photons cause significant problems in impure optics, and so the raw materials used for the production of the optics themselves must be of high purity. Dielectric anti-reflection and high-reflection coatings typically are optimized for the operating wavelength and focusing configuration. Photoresists must display the proper sensitivity at the operating wavelength. This technology development often requires optical radiation which is within several nanometers of the actual operating wavelength.

The molecular fluorine laser is a common source of 157 nm optical radiation. However, these lasers suffer from significant drawbacks. For example, they typically are expensive and require constant maintenance due to contamination produced by the laser discharge. The safety precautions required due to hazards stemming from the use, handling, and venting of fluorine gas greatly add to overall system cost and complexity. The radiation produced by these lasers is fixed at certain wavelengths (i.e., the $F_2$ laser is not wavelength tunable) and the beams produced are of low quality. Additionally, the spectral bandwidth of the radiation produced by $F_2$ laser sources is often too large to allow its use in precision metrology applications.

Hence, there is a need for alternate sources of coherent VUV radiation, both as an alternative and as a complement to excimer and $F_2$ lasers. For example, a source capable of producing VUV pulses (especially at 157 nm and/or 121 nm) at high repetition rates would be a viable alternative to the $F_2$ laser for certain applications. Similarly, a lower power VUV system would also be a viable alternative to $F_2$ lasers for certain applications, particularly if the lower power system had other advantages such as lower cost, higher quality beams and/or simpler maintenance. Even in cases where an $F_2$ laser is a good choice for a particular lithography application, the application itself may generate an ancillary demand for alternate sources at similar wavelengths to complement the $F_2$ laser. For example, components used in the lithography application may need to be inspected at the same VUV wavelengths at which they will be used. For various reasons, sources other than $F_2$ lasers may be preferred for these ancillary tasks.

Solid state sources of VUV optical radiation are difficult to create. One reason is that many solid state nonlinear crystals, which have provided solid-state sources of actinic radiation for previous generations of lithographic devices, become opaque at short (sub-200 nm) wavelengths. For this reason, solid-state VUV sources typically consist of one or more solid-state laser sources whose outputs are frequency-mixed in a gas-phase nonlinear medium. Solid-state VUV sources of this sort suffer from low optical conversion efficiencies, necessitating the use of expensive, high-power laser systems.

Incoherent sources, such as lamps, may be used to produce light at 157 nm and 121 nm. However, these sources often are not bright enough.

Thus, there is a need for optical systems which can produce VUV radiation, particularly at wavelengths similar to or exactly equal to the molecular fluorine line and the Lyman-α hydrogen line, but which additionally overcome some or all of the shortcomings discussed above.

SUMMARY OF THE INVENTION

In accordance with the present invention, a nonlinear optical mixer for producing coherent vacuum ultraviolet radiation includes a cell, a pump laser source and a mixing laser source. The cell contains a gas mixture of xenon gas and a phase-matching gas. The pump laser source generates a pump laser beam directed towards the gas mixture. A sum of two photons from the pump laser beam preferentially excites a two-photon transition in the xenon gas. The mixing laser source generates a mixing laser beam also directed towards the gas mixture. Coherent vacuum ultraviolet radiation is produced by the four wave mixing of a photon from the mixing laser beam with the two photons from the pump laser beam. The gas mixture achieves phase matching of the four wave mixing. The coherent vacuum ultraviolet radiation preferably has a wavelength of approximately 157.63 nm (the molecular fluorine laser line) if the coherent vacuum ultraviolet radiation is produced by difference frequency generation or a wavelength of approximately 121.57 nm (the Lyman-α hydrogen line) if the coherent vacuum ultraviolet radiation is produced by sum frequency generation. It should be noted that although examples will be given with respect to the Lyman-α line of atomic hydrogen, the examples apply equally to the Lyman-α lines of atomic deuterium and tritium as well.

In a preferred embodiment, the pump laser beam and the mixing laser beam are loosely-focused, and spatially and temporally overlapping over a region where the four wave mixing occurs. In a preferred embodiment, mercury vapor is used as the phase-matching gas. In another aspect of the invention, the wavelength of the coherent vacuum ultraviolet radiation is tunable, for example by tuning the wavelength of the mixing laser beam.

In further accordance with the invention, a method for producing coherent vacuum ultraviolet radiation includes the following steps. A cell containing a gas mixture of xenon gas and a phase-matching gas is provided. A pump laser beam and a mixing laser beam are simultaneously directed towards the gas mixture. A sum of two photons from the pump laser beam preferentially excites a two-photon transition in the xenon gas. The four-wave mixing of a photon from the mixing laser beam with two photons from the pump laser beam produces the coherent vacuum ultraviolet radiation. The gas mixture achieves phase matching of the four wave mixing.

The present invention is particularly advantageous because it can produce VUV radiation, particularly at wavelengths similar to or exactly equal to the molecular fluorine line and/or the Lyman-α hydrogen line, and with significantly higher conversion efficiencies than were attainable in the prior art.

BRIEF DESCRIPTION OF THE DRAWING

The invention has other advantages and features which will be more readily apparent from the following detailed description of the invention and the appended claims, when taken in conjunction with the accompanying drawing, in which:

FIGS. 2A–2B are atomic state diagrams illustrating difference-frequency generation (DFG) and sum-frequency generation (SFG), respectively;

DETAILED DESCRIPTION OF THE PREFERRED EMBODIMENTS

Figure 1:
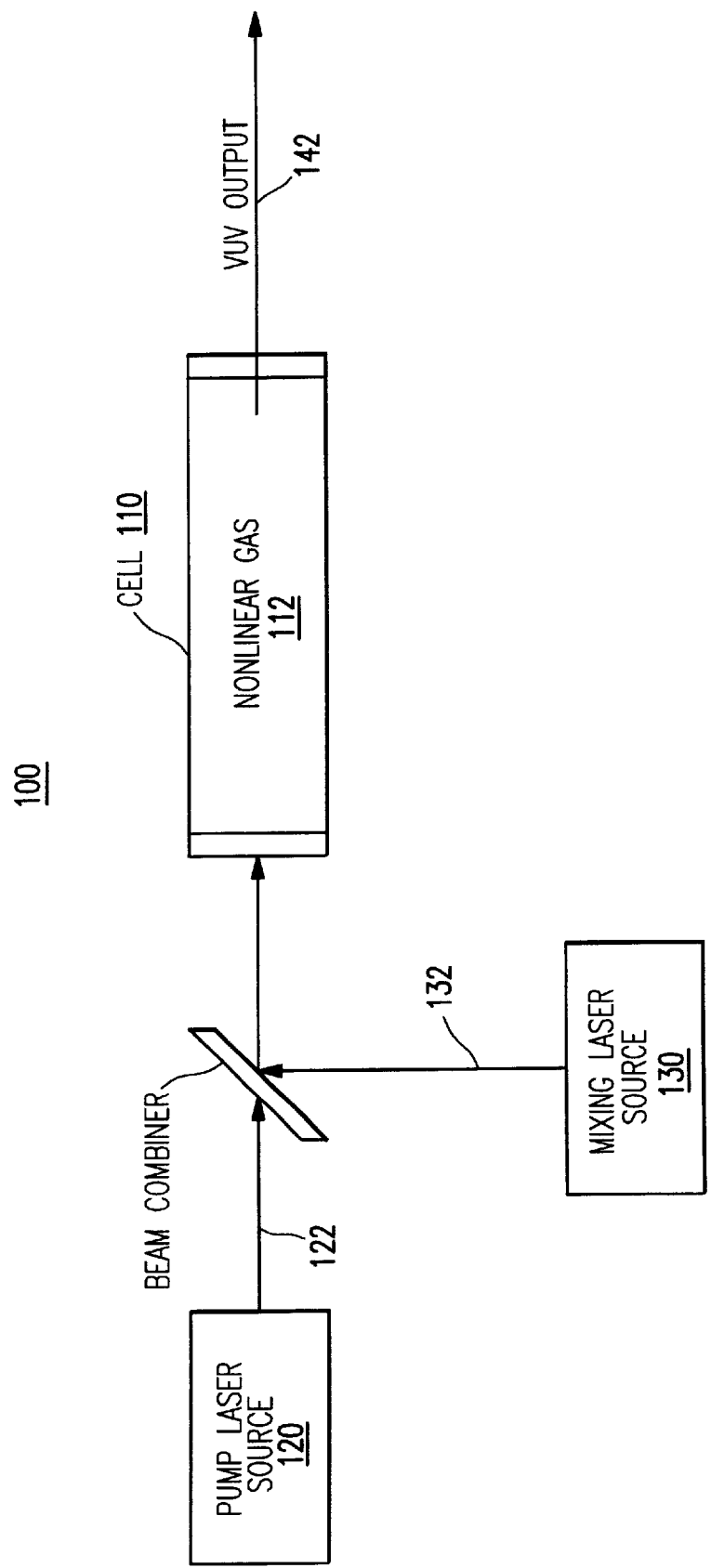
FIG. 1 is a schematic diagram of a nonlinear optical mixer according to the invention.

FIG. 1 is a schematic diagram of a nonlinear optical mixer 100 according to the invention. The mixer 100 includes a cell 110, a pump laser source 120 and a mixing laser source 130. The cell 110 contains a gas 112 which will be used for four wave mixing. For convenience, this gas shall be referred to as the nonlinear gas 112. The pump laser source 120 generates a pump laser beam 122 and the mixing laser source 130 generates a mixing laser beam 132. The two laser beams 122, 132 are directed simultaneously towards the nonlinear gas 112, where they interact with the gas to produce coherent vacuum ultraviolet (VUV) radiation 142 via four wave mixing. More specifically, a sum of two photons from the pump laser beam 122 preferentially excites a two-photon transition in the nonlinear gas. The electronic motion of this two-photon transition is referred to as the material excitation. The mixing laser beam 132 coherently mixes with the material excitation to generate an optical polarization wave. This polarization wave, which physically represents the electron oscillating at the sum- or difference-frequency of the applied laser fields, in turn generates an output laser field 142 with a VUV wavelength. This process is described by Maxwell's equations and is termed four-wave mixing (FWM).

FIGS. 2A–2B are atomic state diagrams illustrating two four-wave mixing processes: difference-frequency generation (DFG) and sum-frequency generation (SFG), respectively. Referring first to FIG. 2A, a sum of two photons 124A, 124B from the pump laser beam 122 preferentially excites a two-photon transition in the nonlinear gas 112. Since FIG. 2 is based on DFG, the VUV photon 144 is equal to the sum of the two pump photons 124 less the photon 134 from the mixing laser beam 132. In other words, $$\omega_{VUV} = \omega_P + \omega_P - \omega_M \quad \text{(Eqn. 1)}$$

where ω is the radian frequency of a laser electric field, and the subscripts VUV, P and M indicate the VUV beam 142, the pump laser beam 122 and the mixing laser beam 132, respectively. FIG. 2A shows three atomic states: 210–212 in order of increasing energy. In the DFG case, the two pump photons 124 excite electrons from the ground atomic state 210 to the most energetic atomic state 212. The mixing photons 134 and VUV photons 144 transition the electrons through the intermediate atomic state 211 back to the ground state 210. The parameters Δω measure detuning of the DFG process from the atomic resonances and will be discussed in further detail below. $\Delta\omega_1$ is the difference between a single pump photon 124A and atomic state 211, $\Delta\omega_2$ is the difference between two pump photons 124A, B and atomic state 212, and $\Delta\omega_3$ is the difference between two pump photons 124A,B less the mixing photon 134 and atomic state 211. The detunings Δω are positive as shown.

FIG. 2B illustrates sum-frequency generation (SFG), where the VUV photon 144 is equal to the sum of the two pump photons 124 plus the photon 134 from the mixing laser beam 132:

$$\omega_{VUV} = \omega_P + \omega_P + \omega_M \quad \text{(Eqn. 2)}$$

FIG. 2B shows four atomic states: 260–263 in order of increasing energy. The detuning parameters Δω are defined as follows. $\Delta\omega_1$ is the difference between a single pump photon 124A and atomic state 261, $\Delta\omega_2$ is the difference between two pump photons 124A,B and atomic state 262, and $\Delta\omega_3$ is the difference between two pump photons 124A,B plus the mixing photon 134 and atomic state 263.

DFG and/or SFG is selected by adjusting the polarizations of the two laser beams 122, 132. For example, if the two laser beams 122, 132 have equal circular polarizations, this favors DFG and suppresses other four wave mixing processes. Opposite circular polarizations of beams 122, 132 favors SFG. If both laser beams 122, 132 are linearly polarized then DFG and SFG processes may occur simultaneously, but with less efficiency. Since the generated VUV radiation 142 is produced by frequency mixing the spectral components of the applied laser fields 122, 132, to the extent that the applied laser fields are monochromatic then the generated VUV radiation will also be monochromatic.

In a preferred embodiment, the VUV radiation 142 is tunable in wavelength. In one embodiment, this is achieved by tuning the wavelength of the pump laser beam 122. In an alternate embodiment, the wavelength of the mixing laser beam 132 is tuned. Tuning the wavelength of the mixing laser beam 132 is generally preferred since this typically will have less impact on the rest of the system 100, as discussed below. For both DFG and SFG, the pump laser beam 122 and mixing laser beam 132 preferably are at wavelengths which are easy to generate and work with.

Figure 3:
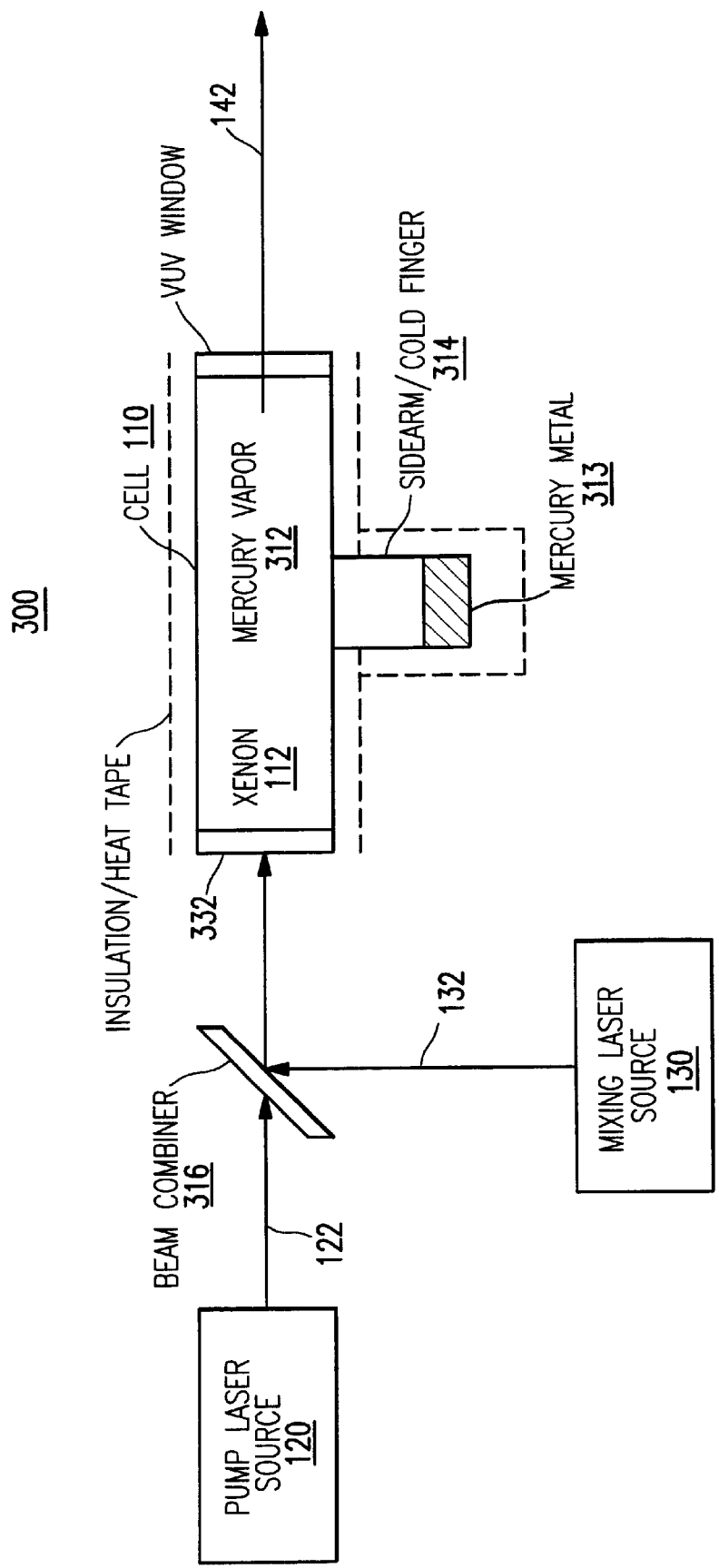
FIG. 3 is a schematic diagram of a preferred embodiment of a nonlinear optical mixer according to the invention.

FIG. 3 is a schematic diagram of a preferred embodiment 300 of nonlinear optical mixer 100. In this embodiment, the cell 110 is filled with a gas mixture of the nonlinear gas 112 and another gas which shall be referred to as a phase-matching gas 312. Xenon (Xe) is used as the nonlinear gas and atomic mercury (Hg) is used as the phase-matching gas. The cell 110 includes a sidearm with cold finger 314, into which a quantity of liquid mercury 313 is distilled. The cell 110 is filled with xenon gas 112 and may be sealed off for simple, low-maintenance operation. The amount and pressure of the xenon gas 112 in the cell 110 depends upon the desired density-length product NL, as will be discussed further below. The atomic mercury is used to phase match the four wave mixing process and phase matching is accomplished by precisely controlling the relative number of xenon and mercury atoms. The vapor pressure of the atomic mercury is determined by the temperature of the sidearm cell 110. When the cell is heated, mercury atoms vaporize and mix with the ambient xenon pressure. The optimum balance of xenon and mercury atoms depends upon the specifics of the four wave mixing process and upon the particular wavelengths of the various laser beams.

Figures 4, 5:
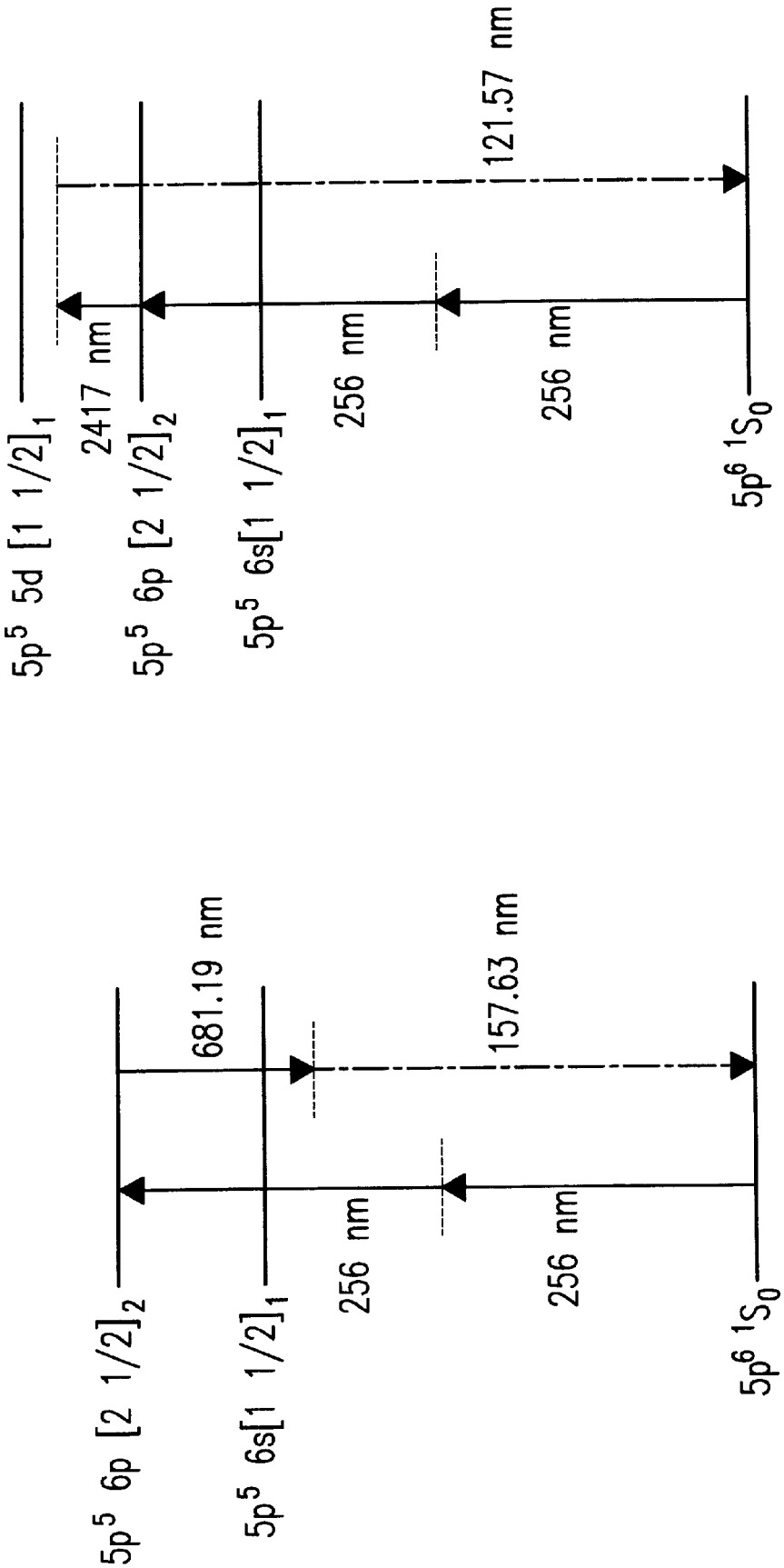
FIG. 4 is an atomic state diagram of atomic xenon illustrating difference-frequency generation of vacuum ultraviolet radiation at a wavelength of 157 nm.
FIG. 5 is an atomic state diagram of atomic xenon illustrating sum-frequency generation of vacuum ultraviolet radiation at a wavelength of 121 nm.

In example system 300, the pump laser beam 122 has a wavelength of approximately 256 nm, in order to preferentially excite the xenon two-photon transition between the $5p^6\,^1S_0$ and $5p^5\,6p\,[2\tfrac{1}{2}]_2$ atomic states. Accordingly, the mixing laser beam 132 must have a wavelength near 681.2 nm in order for DFG to generate VUV radiation 142 with a wavelength which matches that produced by molecular fluorine lasers (157.63 nm). This process is shown in FIG. 4. Alternately, the mixing laser beam 132 must have a wavelength near 2417 nm in order for SFG to produce VUV radiation 142 with a wavelength equal to the Lyman-$\alpha$ wavelength of atomic hydrogen (121.57 nm), as shown in FIG. 5.

As will be shown more rigorously below, in order to reduce unwanted nonlinear effects and deleterious saturation mechanisms, the laser beams 122, 132 preferably should have low optical intensities. In a preferred embodiment, the laser beams have intensities of 100 MW/cm$^2$ or less. However, reducing the intensity of the laser beams 122, 132 also reduces the single-atom conversion efficiency of the four wave mixing process. This effect can be compensated for by suitably increasing the density-length product NL for the nonlinear gas. The density N preferably is low in order to minimize the formation of molecular complexes. Thus, a long interaction length L is required to achieve a high NL product. For example, in system 300, the density of xenon is preferably less than 100 Torr (and may even be less than 10 Torr in some embodiments) but the corresponding interaction length L is preferably on the order of tens of centimeters. This long interaction length is achieved through the use of loosely-focused laser beams 122, 132, which are spatially and temporally overlapping over the region where four wave mixing occurs. The term loosely-focused is intended to include collimated laser beams. The confocal parameter length of the laser beams 122, 132 preferably is longer than the interaction length L. In FIG. 3, the laser beams 122, 132 are shown as collimated and are made overlapping by beam combiner 316. In order to obtain the fall benefit from the long interaction lengths, the four-wave mixing process should be phase matched. In a preferred embodiment, phase matching is achieved by addition of a second element (Hg in this case) to the xenon gas.

A plane-wave description provides a first order model of the four wave mixing process for the case of collimated interacting beams. In this model, the pump and mixing laser beams 122, 132 are modeled as collimated and with equal Gaussian temporal and transverse spatial distributions, which are characterized by pulsewidths $\tau$ and area A, respectively. These quantities are calculated from the beams' full-width-at-half-maximum parameters.

For both DFG and SFG, the applied laser fields 122, 132 couple different eigenstates of the nonlinear gas 112 with opposite parity. Standard analysis yields the intensity of the resulting VUV radiation 142 I(z) as a function of z, the distance from the onset of the four wave mixing interaction. For example, referring to FIG. 3, the distance z is approximately equal to the distance from the front window 332. In a regime where the pump fields are assumed to be undepleted (i.e. low conversion efficiency regime), the intensity is $$I_{VUV}(z) = |d_{eff}|^2 (N\,z)^2 I_P^2 I_M \operatorname{sinc}^2\left[\frac{\Delta k z}{2}\right] \quad \text{(Eqn. 3)}$$

where N is the atomic density of the nonlinear gas 112 (xenon in this case); $I_p$ and $I_M$ are the intensities of the pump and mixing laser beams, respectively; $\Delta k$ is the wavevector mismatch as defined below; and $d_{eff}$ is the effective single-atom nonlinearity, which is a measure of how hard the nonlinear gas may be "driven" by the laser beams 122, 132.

The magnitude of $d_{eff}$ is given by perturbation theory as $$|d_{eff}| \cong \frac{\omega_{VUV}\mu_{12}\mu_{23}\mu_{32}\mu_{21}}{8\varepsilon_0 c \hbar^3}\left(\frac{1}{\Delta\omega_1 \Delta\omega_2 \Delta\omega_3}\right) \quad \text{(Eqn. 4)}$$

for the DFG process where three atomic eigenstates are substantially coupled, or $$|d_{eff}| \cong \frac{\omega_{VUV}\mu_{12}\mu_{23}\mu_{34}\mu_{41}}{8\varepsilon_0 c \hbar^3}\left(\frac{1}{\Delta\omega_1 \Delta\omega_2 \Delta\omega_3}\right) \quad \text{(Eqn. 5)}$$

for the SFG process where four atomic eigenstates are substantially coupled. Here, $\mu_{ij}$ are the dipole matrix elements between atomic states i and j, (for example, $\mu_{12}$ is the matrix element between the 3S and 3P states in FIGS. 2A and 2B) and $\Delta\omega_i$ are the detunings of the applied laser fields from the atomic resonances as defined in FIGS. 2A and 2B. $\omega_{VUV}$ is the radian frequency of the resulting VUV radiation 142. $\epsilon_0$, c and h are the permittivity of free space, the speed of light, and Planck's constant, respectively.

Substituting Eqn. 4 into Eqn. 3, assuming perfect phase matching (i.e., assuming $\Delta k=0$) and evaluating $I_{VUV}$ (z) at z=L yields an estimate of the intensity of the outgoing VUV radiation 142 for the DFG process:

$$I_{VUV}(L) \cong 0.0783 \times (NL)^2 \times \left|\frac{\mu_{12}\mu_{23}\mu_{32}\mu_{21}}{\Delta\omega_1 \Delta\omega_2 \Delta\omega_3}\right|^2 \times I_P^2 I_M \qquad \text{(Eqn. 6)}$$

where the various terms are entered in the following units: NL in $10^{17}$ atoms/cm$^2$; matrix elements $\mu_{ij}$ in atomic units (a.u.); detunings $\Delta\omega_i$ in 1000 cm$^{-1}$; and laser intensities in MW/cm$^2$. The resulting VUV intensity is in Watts/m$^2$. The intensity expression in Eqn. 6 can be used to estimate the conversion efficiency of this process, as defined by the ratio $I_{VUV}/I_M$. The conversion efficiencies of typical prior-art FWM vapor-phase experiments at different wavelengths and using different atomic systems have been usually much less than 0.1%. In contrast, Eqn. 6 predicts conversion efficiencies in excess of 5% (although Eqn. 6 does not take into account all deleterious effects).

The generated VUV pulse energy is determined by integrating the VUV intensity over the spatial and temporal profile. Gaussian pulse shapes in space and time are assumed for this analysis. Based on the xenon configuration described above, one estimate of pulse energy is $$E_{VUV} \cong 0.296 \times I_{VUV} \tau A \qquad \text{(Eqn. 7)}$$

$I_{VUV}$ is the peak on-axis intensity of the generated VUV beam 142 as given by Eqn. 6. $\tau$ and A are the pulsewidth and area of overlap of the applied laser beams 122, 132. The area of the generated beam 142 will be slightly smaller but this is taken into account by the numerical factor. The units of the intensity $I_{VUV}$, pulsewidth $\tau$, and pulse area A are chosen consistently, e.g. W/cm$^2$, ns, and cm$^2$.

As an example, assume that the areas and pulsewidths of the applied laser beams 122, 132 are on the order 1 to 2 mm$^2$ and 1 to 5 ns, respectively. According to Eqn. 7, to obtain a VUV pulse energy of 100 $\mu$J, the maximum intensity of the VUV beam 142 should be on the order of 1 to 10 MW/cm$^2$. Referring to Eqn. 6, the matrix elements $\mu_{ij}$ and detunings $\Delta\omega_i$ are determined by the choice of nonlinear gas 112. If the intensities of the pump and mixing laser beams $I_P$ and $I_M$ are limited (e.g., by technology, economics or saturation processes), then implementing phase-matching methods and maximizing the density length product NL is a preferred approach to maximizing the intensity of the generated VUV beam 142.

A similar analysis applies to the SFG process.

Eqns. 6 and 7 are a first order estimate of the intensity and pulse energy attainable by four wave mixing. Additional effects will degrade the actual conversion efficiency which can be achieved. These effects include phase mismatch, absorption, and shifts of the resonance locations due to the intensity of the laser fields. The following paragraphs describe each of these effects in turn.

Phase matching is the process of minimizing the difference in phase velocities between the polarization wave and the generated VUV beam 142, and is an important aspect of a nonlinear optical process. If phase matching is achieved, those portions of VUV radiation generated in different portions of the medium will add coherently to maximize the output. If there is incomplete phase matching, destructive interference will occur to some extent and the measured conversion efficiency will be dramatically reduced. All media are dispersive to some degree so that different optical frequencies propagate faster or slower than others. The result of this dispersion is that, generally speaking, arbitrary nonlinear optical processes are not phase matched and affirmative steps must be taken if phase matching is desired. While there are significant advantages if phase-matching is achieved, the implementation of phase matching is particular to different media and different nonlinear processes, and is especially difficult in the case of isotropic atomic nonlinear media.

Figure 6:
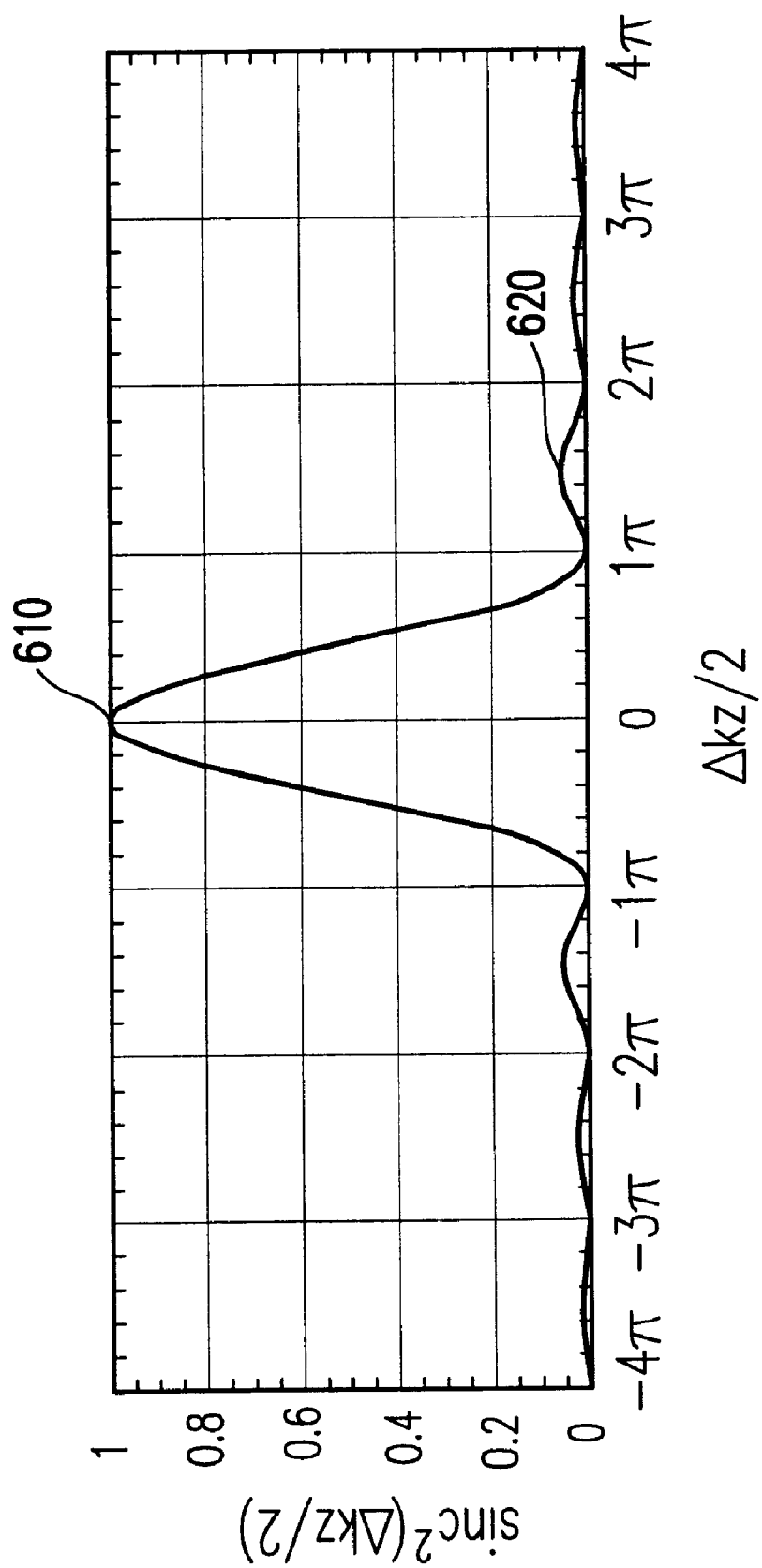
FIG. 6 is a plot illustrating the effect of phase mismatch on four-wave mixing efficiency in a collimated laser beam geometry.

Referring to Eqn. 3, the sinc$^2$( ) term in the equation represents the effect of phase mismatch. FIG. 6 is a plot of this term as a function of the variable $\Delta$kz. k refers to the wavevectors of the individual laser fields and is related to the laser frequency $\omega$ and the index of refraction n($\omega$) via k($\omega$)=n($\omega$)$\omega$/c, where c is the speed of light in vacuum. In the DFG configuration, $\Delta k = k_{VUV}+k_M-2k_P$. In the SFG configuration, $\Delta k = k_{VUV}-(k_M+2k_P)$. The net phase mismatch over some propagation distance z is given by ($\Delta kz$) and determines the effect of phase mismatch on conversion efficiency, as shown in FIG. 6. Preferably, $\Delta k$ is zero, in which case the sinc$^2$( ) term equals unity (see point 610) and the generated VUV radiation 142 grows as the square of the density-length NL product. The next-highest peak 620, corresponding to a total phase mismatch of $3\pi$, over the length of the cell, is approximately 5% of the maximum value 610.

Figure 7A:
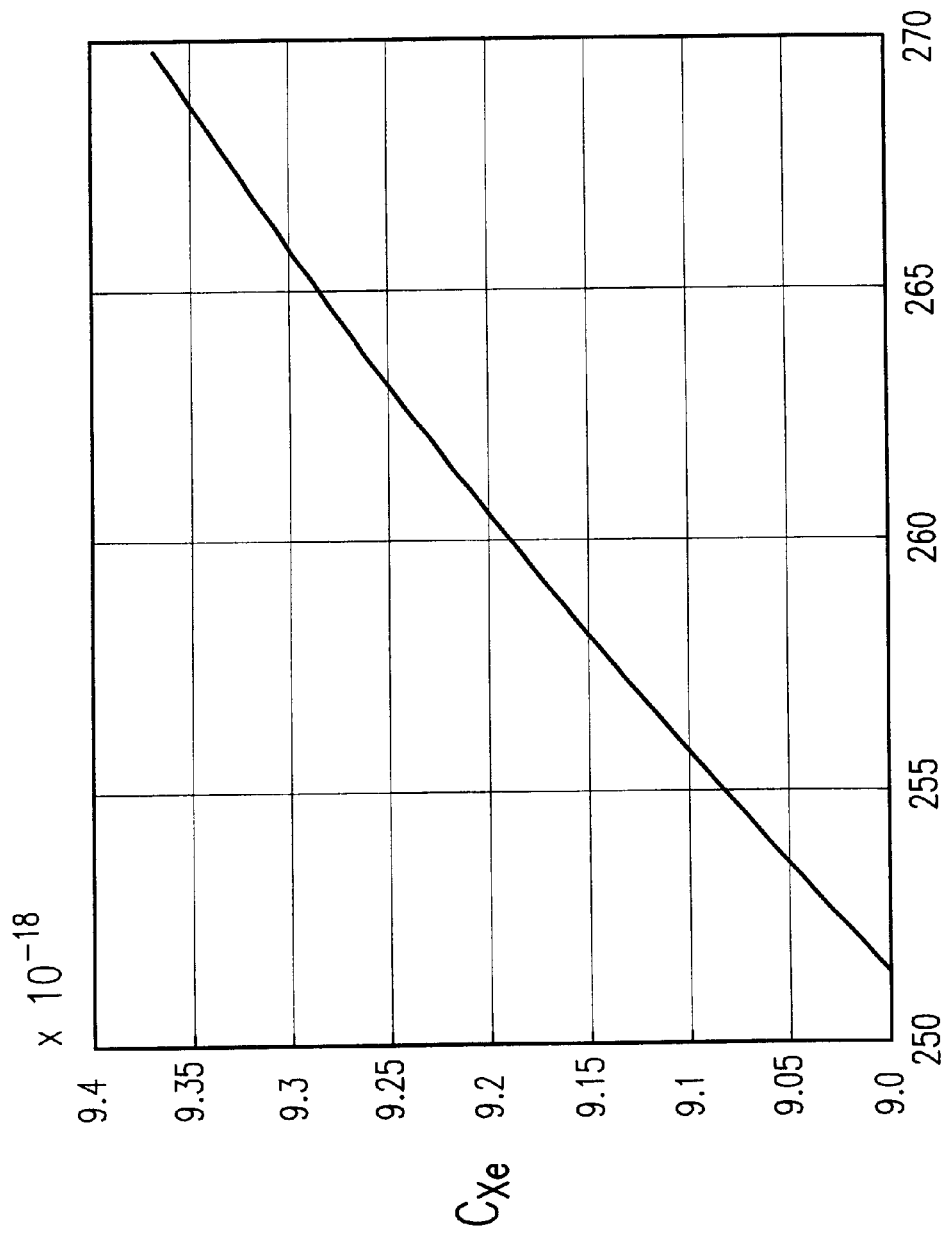
FIGS. 7A–7C are graphs illustrating the use of atomic mercury for phase matching difference-frequency generation in atomic xenon.

The phase mismatch per atom of a given species, i.e. $\Delta k/N$, has traditionally been represented by the variable C, which has the units of cm$^2$. A plot of this quantity for the DFG process in xenon is shown in FIG. 7A as a function of the wavelength of the pump laser beam 122. It is important to note that the value of C depends only on the nonlinear optical process and choice of wavelength for the applied laser beams. If nothing is done to change the amount of phase mismatch per atom, then the minimum NL product which will maximize the generation of the VUV radiation 142 is roughly determined by the condition that $\Delta k L = \pi$. Since $\Delta k = NC$, substitution yields $(NL)_{MAX}=\pi/C$, where the MAX subscript indicates that this value of NL maximizes the generation of VUV radiation. As an example, consider the Xe DFG process of FIG. 4. Assume a degenerate two-photon pump wavelength of 256 nm to generate 157.63 mn. From FIG. 7A, $C_{Xe}=9.1\times10^{-18}$ cm$^2$ at this pump wavelength. This value of C results in an $(NL)_{MAX}$ of $3\times10^{17}$ cm$^{-2}$. In light of the conversion efficiency calculated from Eqn. 6, and constraints on the intensities of the interacting laser beams, this value of NL is insufficient to generate VUV pulses with energies greater than about 1 $\mu$J. In order to increase the net number of atoms participating in the nonlinear generation of VUV radiation 142 and thus increase the conversion efficiency, it is preferable that C $\to$ 0 and $(NL)_{MAX} \to \infty$.

Phase matching in gases can be accomplished by adding a second gas 312 which has a phase mismatch term C of opposite sign. At a certain pressure ratio of the gases, the two phase mismatches will effectively "cancel" each other. This is possible because the phase velocity of the laser fields is a macroscopic quantity and depends upon all the atoms in the laser's path, not just the ones contributing to the nonlinearity. This is described by the equation $$C_{TOT}=C_aN_a+C_bN_b\to 0 \qquad \text{(Eqn. 8)}$$

where $C_{TOT}$ is the effective phase mismatch term for the gas mixture, and $C_a$, $C_b$ and $N_a$, $N_b$ are the phase mismatch term and atomic density for each of the two atomic species. Phase matching occurs when $C_{TOT}=0$, or equivalently when $N_a/N_b=-C_b/C_a$. Note that each C, and therefore the optimum atomic density ratio, is a function both of the wavelengths of the interacting fields, and of the particular field configuration (e.g., DFG or SFG.)

Figure 7B:
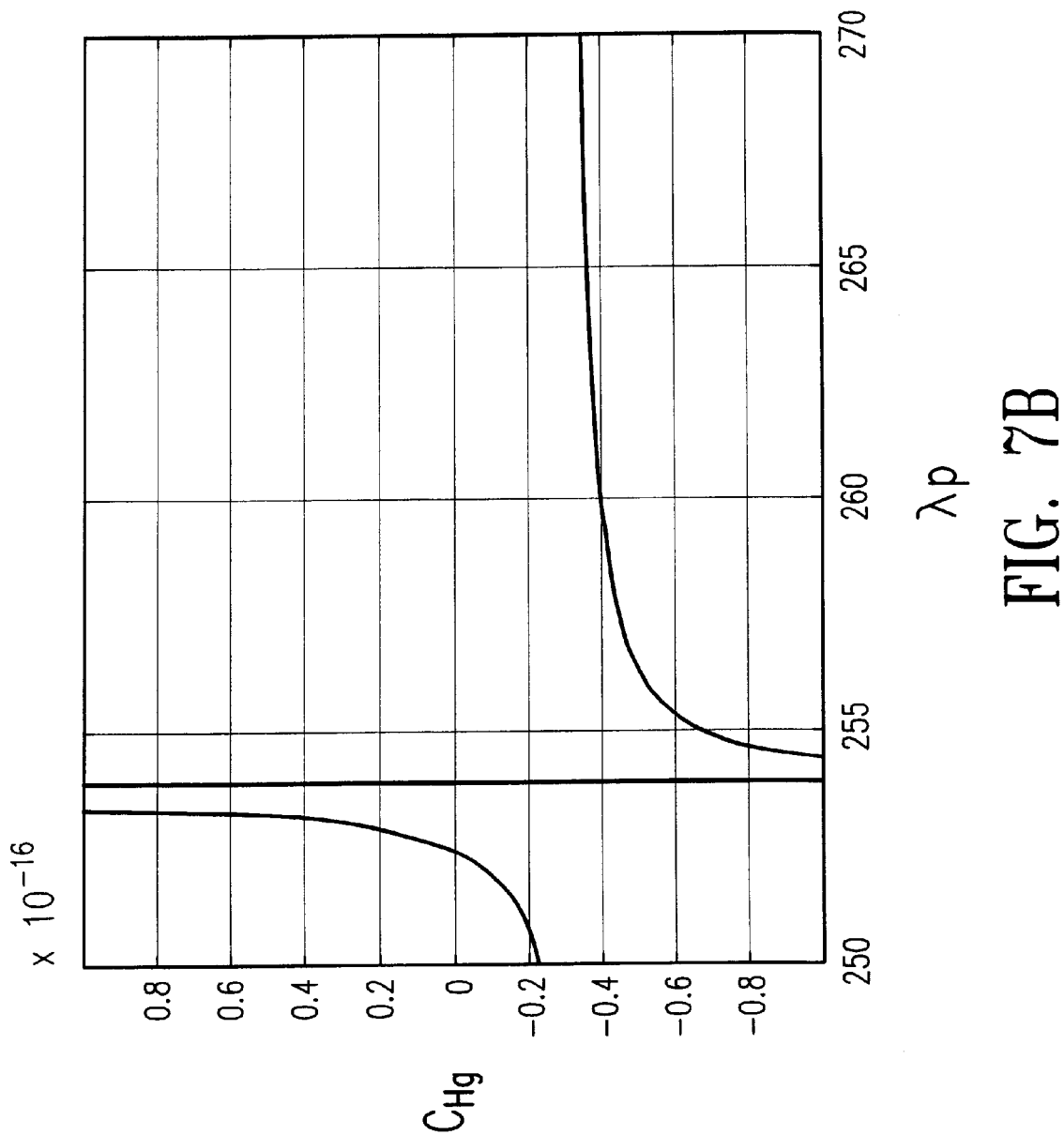
Figure 7C:
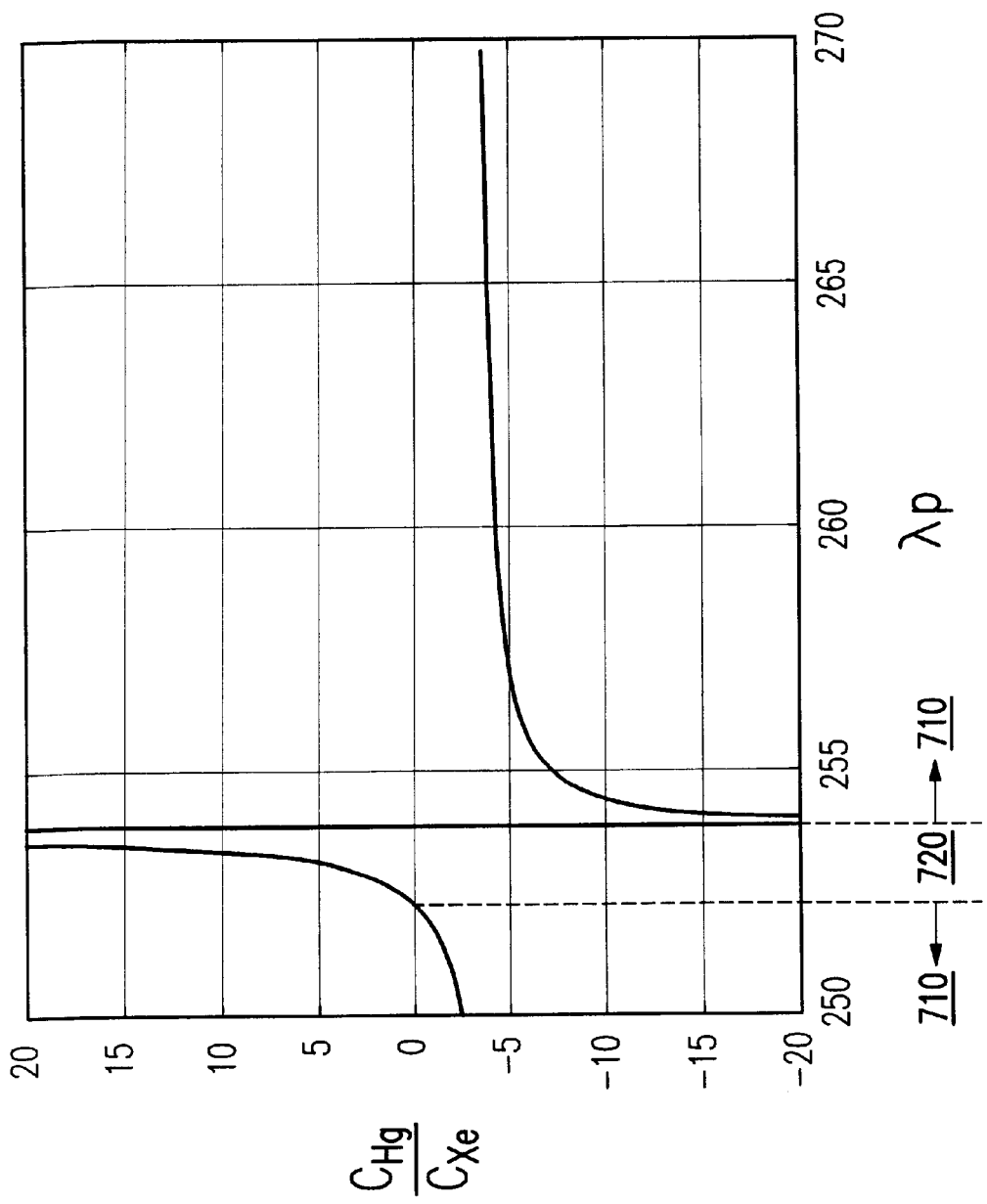

FIGS. 7A–7C are graphs illustrating the use of atomic mercury for phase matching DFG in atomic xenon, for the process described in FIG. 4. FIGS. 7A and 7B are plots of the single-atom phase mismatch parameter $C_{Xe}$ and $C_{Hg}$ for atomic xenon and mercury, respectively, as a function of the wavelength of the pump laser beam 122. These plots are for DFG of 157 nm radiation. FIG. 7C is a plot of the ratio $R=C_{Hg}/C_{Xe}$ as a function of pump wavelength $\lambda_P$. From Eqn. 8, phase matching occurs when $N_{Xe}/N_{Hg}=-C_{Hg}/C_{Xe}$. Thus, phase matching can be achieved when the ratio R is negative, in the region 710. In region 720, R is positive and phase matching of this nonlinear process cannot be achieved by mixing xenon and mercury since they both have mismatch parameters C of the same sign.

As shown in FIG. 7, atomic mercury is a preferred choice for the phase matching gas 312 for this DFG process since its mismatch parameter C is large and negative at the pump wavelength $\lambda_P$ of 256 nm. This is because 256 nm is near-resonant to a strong mercury electronic transition. At a pump wavelength of 256 nm, $C_{Hg}=-5\times10^{-17}$ cm$^2$, and $C_{Xe}=9.1\times10^{-18}$ cm$^2$. Thus, a mixture of approximately 1 mercury atom for every 6 xenon atoms will phase match this four wave mixing process. Preferably, the ratio of xenon atoms to mercury atoms lies in the range of 5:1 to 7:1. Referring to FIG. 3, the desired ratio of mercury to xenon atoms is achieved by varying the temperature of the cell 110. For example, the mercury vapor pressure at a temperature of 200 C is approximately 10 Torr. In order to achieve the 1:6 ratio, the optimum xenon pressure is approximately 60 Torr. If higher temperatures are used, the vapor pressure of the mercury will increase, facilitating the use of higher xenon pressures also. Higher xenon pressures, in turn, increase the NL product for a fixed value of L. However, higher pressures also increase the formation of molecular complexes which can absorb the generated VUV radiation.

In the embodiment shown in FIG. 3, a fixed amount of xenon gas 112 is introduced into the cell 110. The pressure of the mercury vapor 312, and thus the ratio of Hg:Xe atoms, is precisely adjusted by fine-tuning the temperature of the sidearm 314 to phase match the nonlinear process and maximize the conversion efficiency. Typically, the body of the cell 110 is maintained approximately 50 C higher than the sidearm 314 to prevent condensation of the mercury onto the windows. In addition, a temporally stable and spatially uniform temperature profile is produced across the cell using standard laboratory techniques. This results in a homogenous xenon/mercury mixture throughout the cell 110, thus preserving phase matching over the entire length of the cell.

Using these numbers in Eqn. 6 yields an estimate of the intensity of the VUV radiation 142 produced by mixer 300. In particular, assume the following example. The xenon 112 is at a pressure of 50 Torr and the cell 110 is 10 cm long. This results in NL=$1.8\times10^{19}$ atoms/cm$^2$. The matrix elements $\mu_{12}=\mu_{21}=0.663$ a.u. and $\mu_{23}=\mu_{32}=1.134$ a.u. $\Delta\omega_1$, $\Delta\omega_2$ and $\Delta\omega_3$ equal 29,000, 0.1 and 4,605 cm$^{-1}$, respectively. The pump and mixing laser beams 122, 132 each have an intensity $I_P$ and $I_M$ of 30 MW/cm$^2$. Assuming perfect phase matching by mercury, the predicted output intensity $I_{VUV}$, based on Eqn. 6, is 12 MW/cm$^2$ at the end of the cell. The resulting predicted conversion efficiency is 40%. This estimate for the output intensity is based on the so-called 'undepleted pump' approximation, which is valid for small conversion efficiencies, and has not yet taken into account absorption or other factors. A more complete analysis in this case indicates that these factors likely will limit the intensity of the VUV radiation to the 1 to 10 MW/cm$^2$ range. Conversion efficiencies of 5–10% are more expected for this particular case.

Figure 8A:
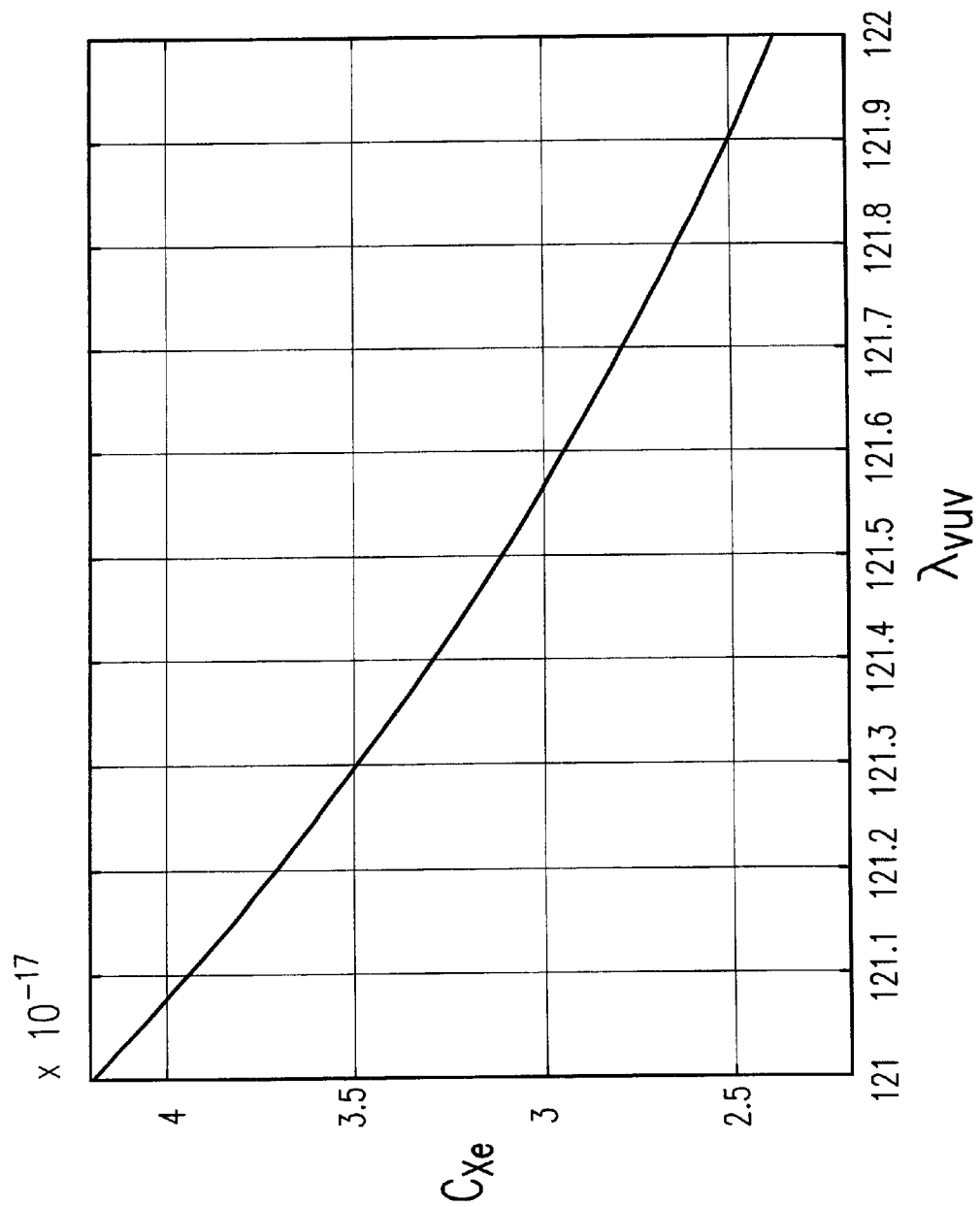
FIGS. 8A–8C are graphs illustrating the use of atomic mercury for phase matching sum-frequency generation in atomic xenon.
Figure 8B:
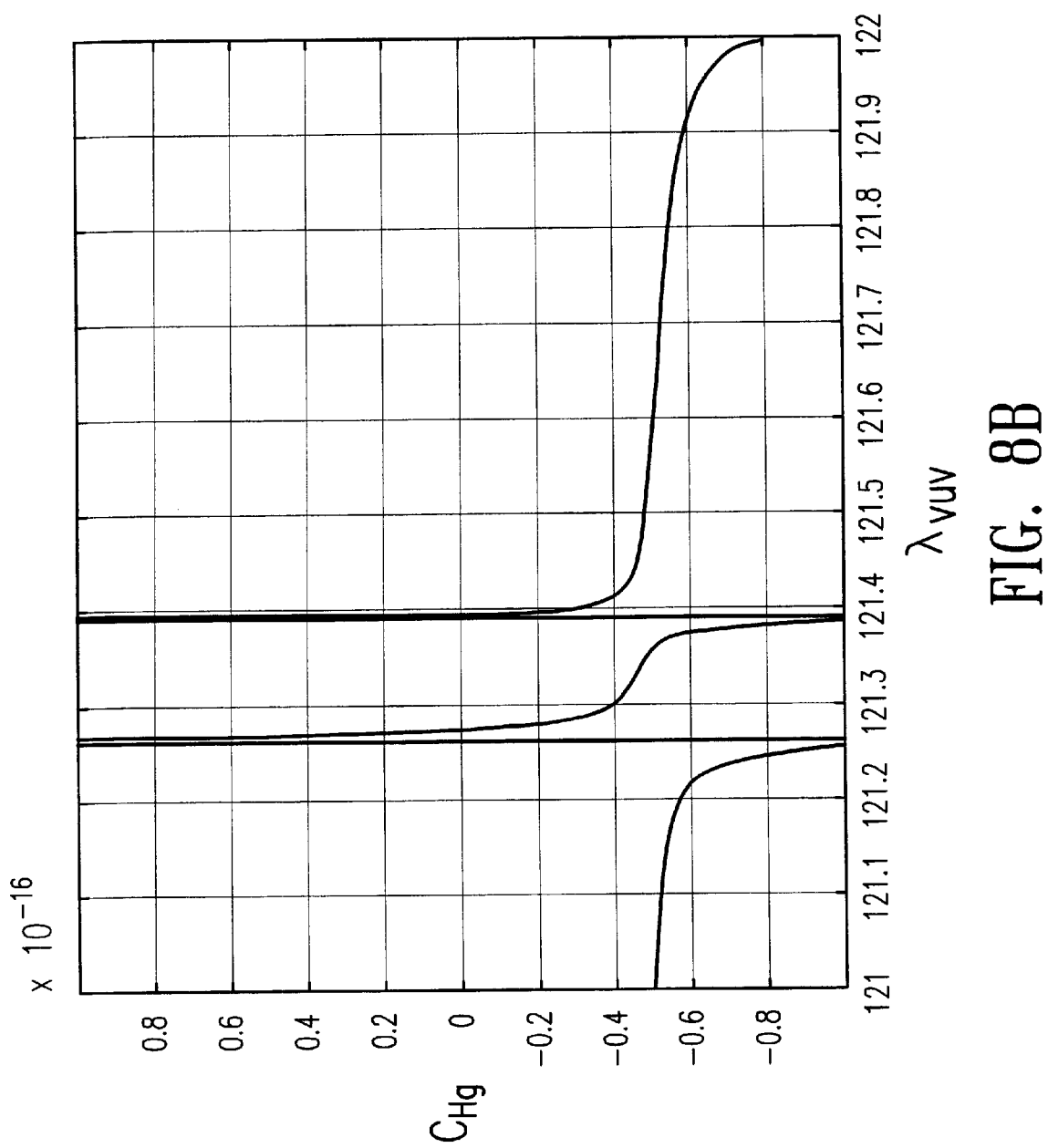
Figure 8C:
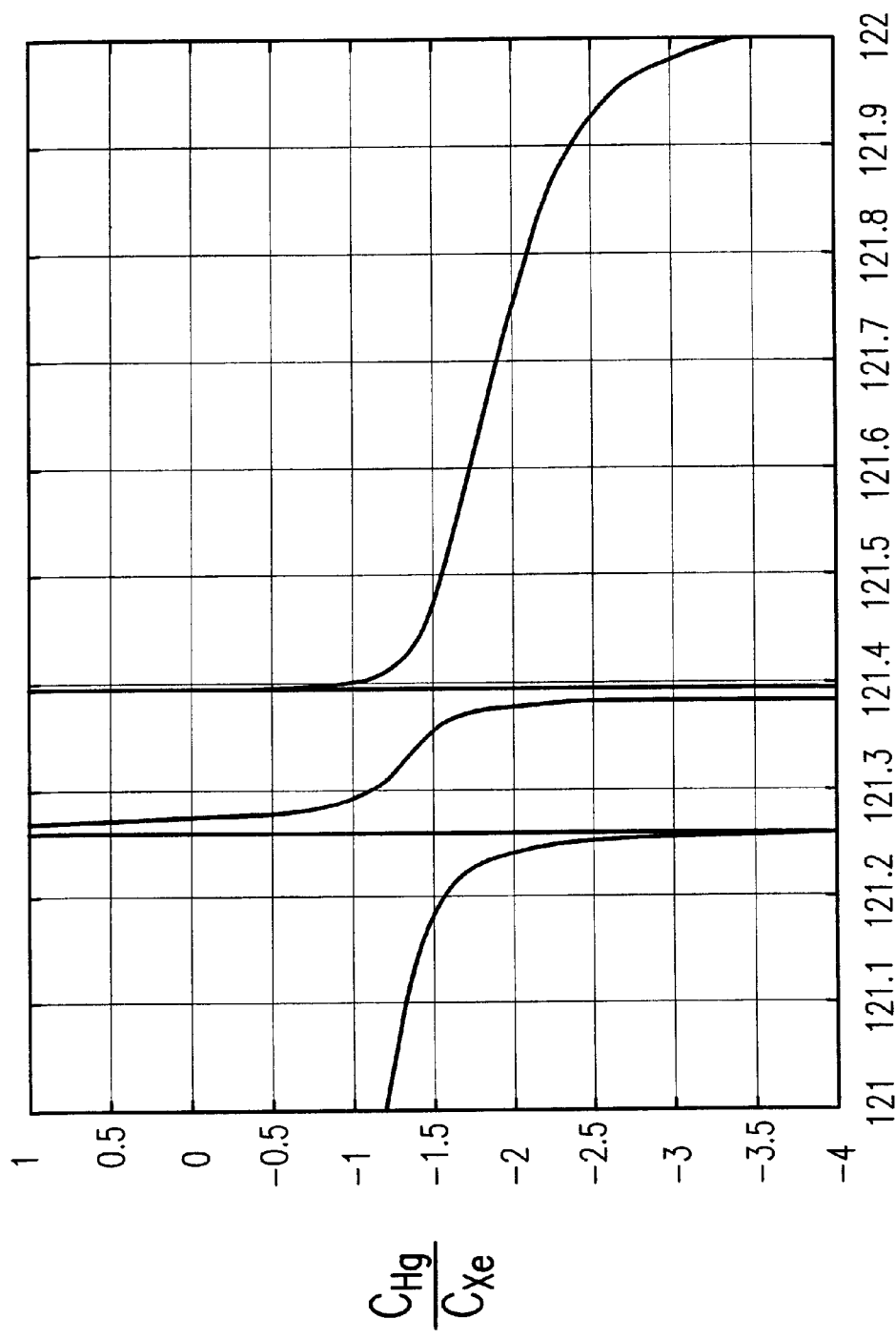

FIGS. 8A–8C are graphs illustrating the use of atomic mercury for phase matching SFG in atomic Xe, for the process described in FIG. 5. FIGS. 8A and 8B are plots of the single-atom phase mismatch parameter $C_{Xe}$ and $C_{Hg}$ for atomic Xe and Hg, respectively, as a function of the wavelength of the generated VUV radiation 142. These plots assume a fixed pump wavelength $\lambda_P$ of 256 nm. The output wavelength is changed by adjusting the wavelength of the mixing laser. FIG. 8C is a plot of the ratio $R=C_{Hg}/C_{Xe}$ as a function of VUV wavelength $\lambda_{VUV}$. From Eqn. 8, phase matching occurs when $N_{Xe}/N_{Hg}\times-C_{Hg}/C_{Xe}$. Thus, phase matching can be achieved when the ratio R is negative, which is the vast majority of the wavelength region shown in FIG. 8C. In a preferred embodiment, the ratio of xenon atoms to mercury atoms lies in the range of 1.5:1 to 2.5:1.

Linear absorption, nonlinear absorption, and nonlinear phase shift are additional factors which can affect the four wave mixing process.

Although linear absorption of the generated VUV radiation 142 is fairly insignificant for both atomic xenon and mercury (since both the 157 and 121 nm lines are detuned far from absorbing atomic transitions), there is the possibility of VUV absorption at both 157 nm and 121 nm in molecular xenon complexes. The density of xenon molecules (Xe$_2$) at room temperature (300 K) is approximately 0.61% of the total xenon density. Thus, at a base pressure of 60 Torr (an atomic density of $2.12\times10^{18}$ cm$^{-3}$) the Xe$_2$ density is expected to be $1.3\times10^{16}$ cm$^{-3}$. The percentage of xenon molecules decreases with increasing temperature in approximately a Boltzmann relation. These xenon molecules cause a long-wavelength (red) absorption "shoulder" to appear on the 68045 cm$^{-1}$ Xe resonance-line transition and impart a significant amount of absorption to wavelengths as long as 154 nm. The width of the extra absorption scales at least as the square of the xenon gas density. One estimate of the absorption coefficient k(v) for xenon at 157 nm is $$\ln\left[\frac{k(v)}{P^2}\right] < -17 \qquad \text{(Eqn. 9)}$$

where P is the xenon gas pressure in Torr and k(v) is in cm$^{-1}$. At a pressure of 50 Torr, the expected absorption coefficient is less than 10$^{-4}$ cm$^{-1}$, which over 30 cm results in a reduction of approximately 0.3% of the VUV signal. By comparison, at a xenon pressure of 1 atmosphere, the absorption coefficient would increase to 2.4% cm$^{-1}$ with a 30-cm reduction of the VUV signal of 70%. Molecular xenon absorption bands are also expected near the Lyman-$\alpha$ hydrogen line, specifically centered at approximately 120.8 and 121.3 nm. As a result, low pressures are preferred in order to reduce these absorption effects.

Nonlinear absorption is caused by the simultaneous absorption of two pump laser photons. It ultimately limits the density-length product NL that may be used in four wave mixing processes in which intense laser fields are applied near to or exactly on two-photon resonances.

Assuming that the upper state is Doppler-broadened with a full width half max (FWHM) Doppler width of $\Delta\omega_D$, the cross-section for two-photon absorption is given by $$\sigma_{2PA}[cm^4/Watt] = 4.1 \times 10^{-28} \left|\frac{\mu_{12}\mu_{23}}{\Delta\omega_{eff}}\right|^2 \left(\frac{\hbar\omega_P}{\Delta\omega_D}\right) \quad \text{(Eqn. 10)}$$

where the pump laser photon energy $\hbar\omega_P$ is in eV; the Doppler width $\Delta\omega_D$ is in $cm^{-1}$; the matrix elements $\mu_{ij}$ are in atomic units; and the detunings $\Delta\omega_i$ are in 10000 $cm^{-1}$. This absorption cross-section causes a decrease in the intensity of the pump laser beam $I_P$ equal to $$\frac{I_P(z)}{I_P(0)} = \frac{1}{1 + N\sigma_{2PA}I_P(0)z} \quad \text{(Eqn. 11)}$$

Because the pump laser intensity is diminished by two-photon absorption (as well as depletion due to generation of the VUV output beam 142) as the field propagates through the medium, the conversion efficiency will be reduced from the value predicted by Eqn. 6. Continuing the Xe/Hg DFG example, the xenon two-photon absorption cross-section $\sigma_{2PA}$ for this example is calculated to be $2.93 \times 10^{-27}$ $cm^4$/Watt. At an initial intensity $I_P(0)$ of 30 MW/$cm^2$ for the pump laser beam and a xenon pressure of 50 Torr, the absorption coefficient N $\sigma_{2PA}$ $I_P(0)$ is approximately 16% per cm. Over 30 cm, this causes a 80% reduction of the peak intensity of the pump laser beam 122, which generally is acceptable but reduces the overall VUV conversion efficiency from that predicted by Eqn. 6.

Additionally, as a result of the two-photon absorption, electrons will be stimulated to the upper atomic state at a rate (in units of $sec^{-1}$)$W^{(2)}$ which is set by the intensity of the strong two-photon-resonant pump laser, according to $$W^{(2)}(t) = \frac{\sigma_{2PA}I_P^2(t)}{\hbar\omega_P} \quad \text{(Eqn. 12)}$$

Thus, two-photon absorption can have two effects on four wave mixing. First, it depletes the intensity of the pump laser beam 122 by an amount depending on the density-length product NL as calculated from Eqn. 11. Second, the electron population which is excited to the upper atomic state will spontaneously emit to low-lying states on roughly a 5-ns time scale. These spontaneous photons may ultimately be amplified, resulting in amplified spontaneous emission (ASE) which can be of considerable brightness. This ASE can, in turn, act as a separate mixing field, and cause parametric gain (which is automatically phase matched) on the resonance line(s) of the atomic species. If a large fraction of the population is transferred to the excited state, the phase matching condition, which assumes that the population resides entirely in the ground state, may be broken.

For the Xe/Hg DFG example, the two-photon excitation rate is approximately $3.4 \times 10^6$ $sec^{-1}$, which over a 5-ns square-wave exciting pulse will result in (a conservative estimate) a 1.6% transfer of population into the upper state. This is sufficient to produce significant amounts of ASE, most likely at 992.6 nm, corresponding to the Xe 6p-6s transition, but generally insufficient to break the phase matching condition. However, since the 6s-5p transition at 146.9 nm will be strongly radiation trapped, the 6s population may build up and cause the ASE to self-terminate. This saturation mechanism can be substantially eliminated by small two-photon detunings. However, these detunings will also reduce the conversion efficiency.

Nonlinear phase shift can also occur when near-resonant strong optical fields are applied. In this effect, the phase shift of one laser field depends upon the intensity and detuning of a second laser field, an effect known as Kerr modulation. Additionally, each field can alter its own phase shift, an effect known as self-phase modulation. This effect may be described by a degenerate four-wave-mixing formulation and is automatically phase matched. Since the index of refraction of the beam now depends explicitly upon the laser intensity, self-phase-modulation can give rise to self-focusing and self-defocusing of Gaussian spatial profile laser beams and distort the temporal and spatial profile of the generated VUV radiation. The configuration shown in FIG. 3, with collimated laser beams, reduces the intensity of the laser fields and also the magnitude of this effect.

FIGS. 9A–9D are graphs of the magnitude of the material excitation as a function of the two-photon detuning of the pump laser beam, illustrating the shift of optimum pump laser wavelength as a function of the intensity of the pump laser beam 122. In order to increase conversion efficiency, the wavelength of the pump laser beam 122 should be close if not equal to half of a dipole non-allowed transition in the atomic xenon. The exact detuning $\Delta\omega_2$ of the pump laser beam 122 from two-photon resonance is also a function of the intensity of the pump laser beam, via the Stark effect. For weak pump laser intensities (typically, less than 10 MW/$cm^2$), the maximum material excitation, as measured by the Doppler-averaged atomic coherence established between the ground and two-photon-pumped atomic eigenstates, occurs substantially on resonance and the sum of two photons from the pump laser beam preferably is within 5 GHz of resonance. For higher intensities (typically, above approximately 50 MW/$cm^2$), the maximum excitation is shifted off-resonance. The two-photon detuning is small in scale, typically on the order of GHz.

Figure 9A:
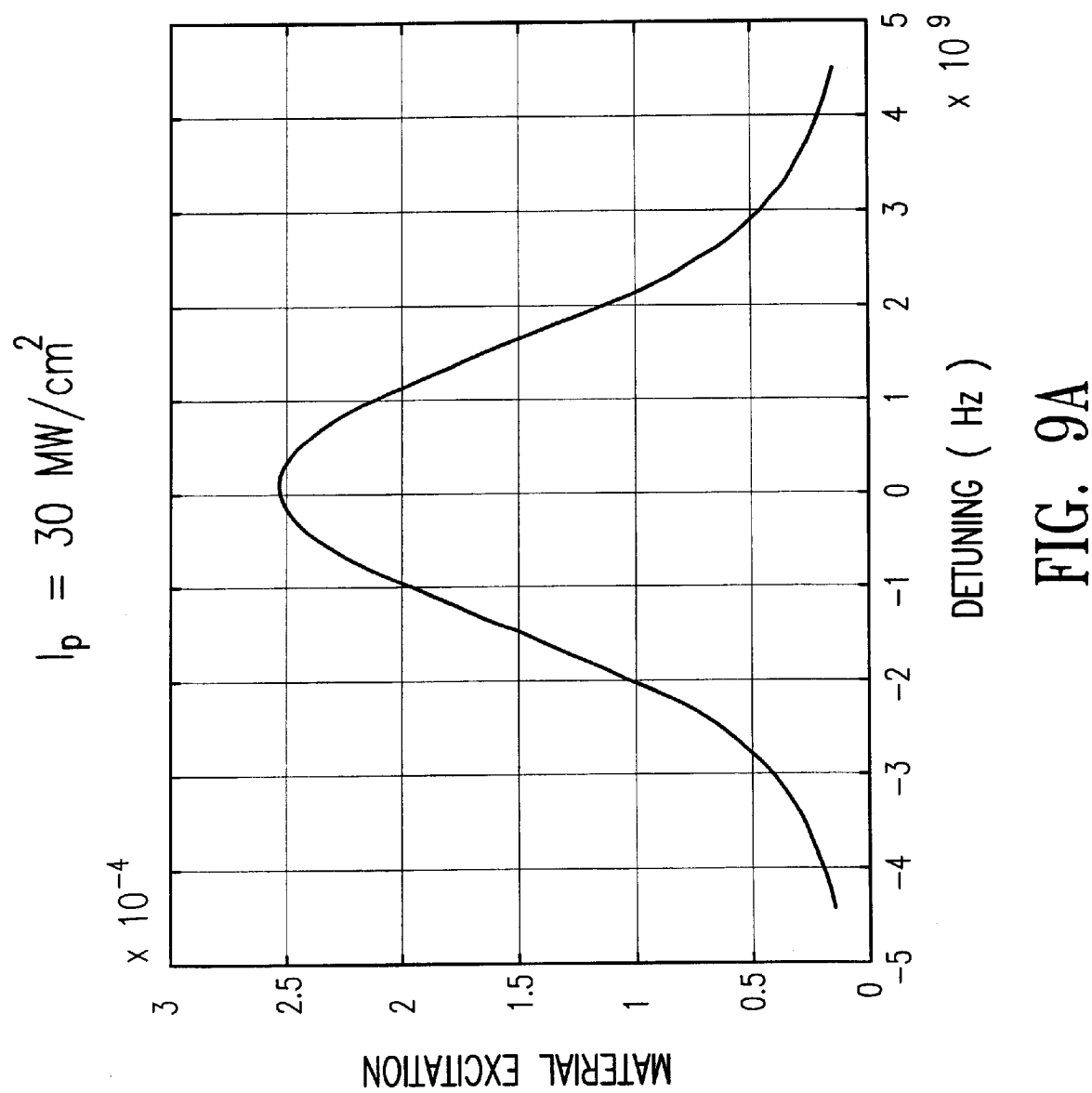
FIGS. 9A–9D are graphs of material excitation as a function of the two-photon detuning of the pump laser beam, illustrating the shift of peak excitation from exact two-photon resonance caused by high intensity optical fields.
Figure 9B:
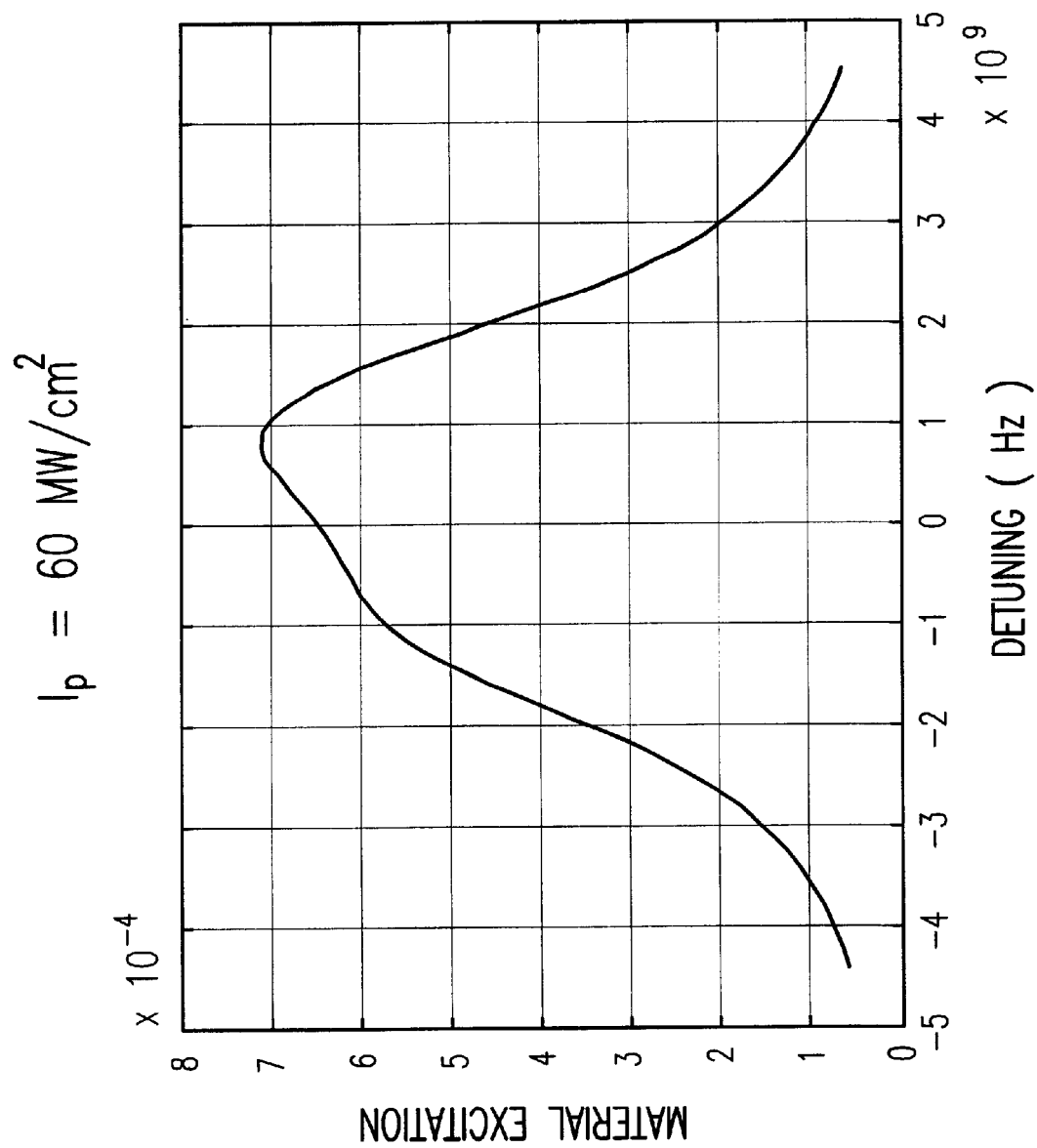
Figure 9C:
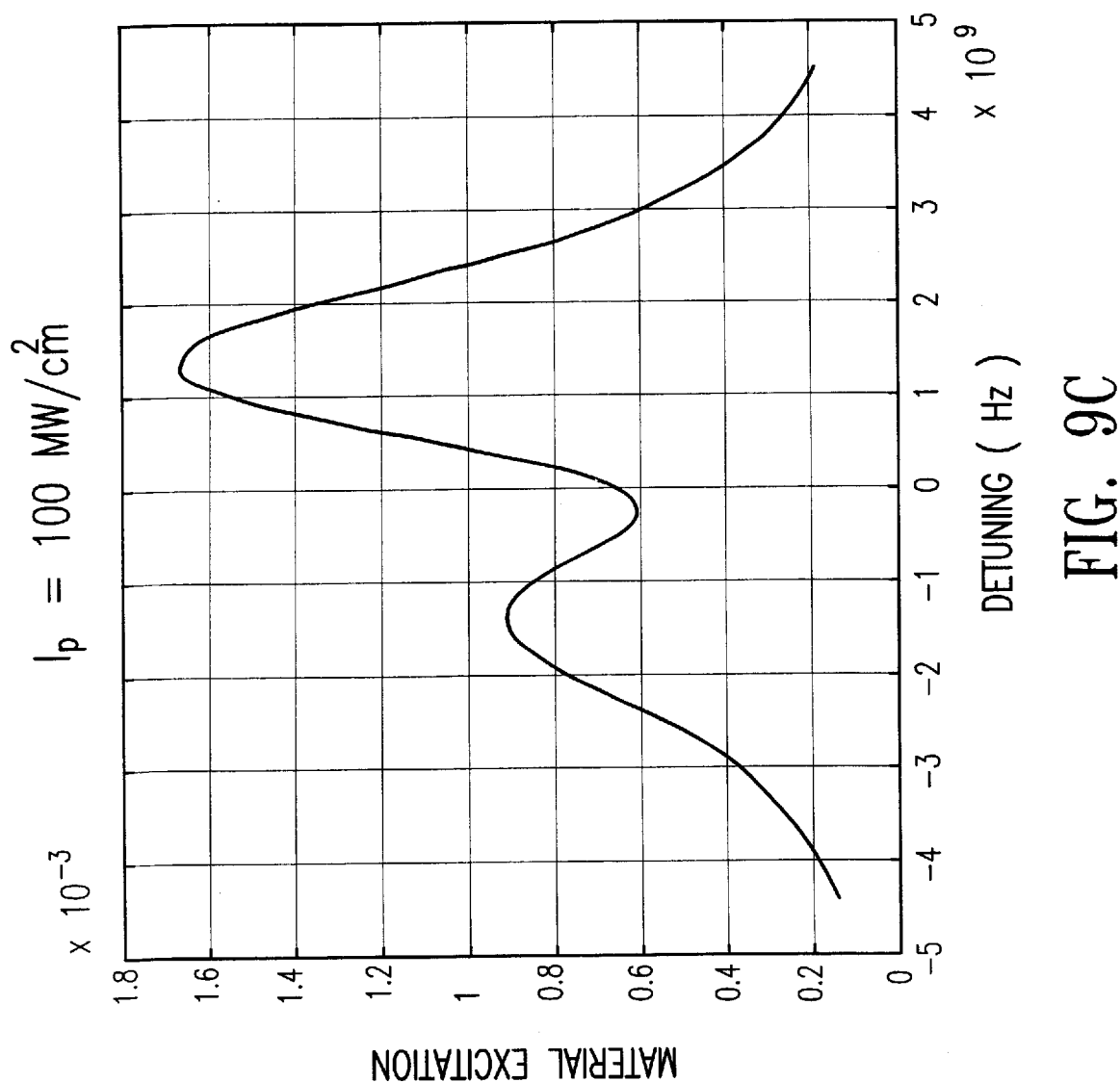
Figure 9D:
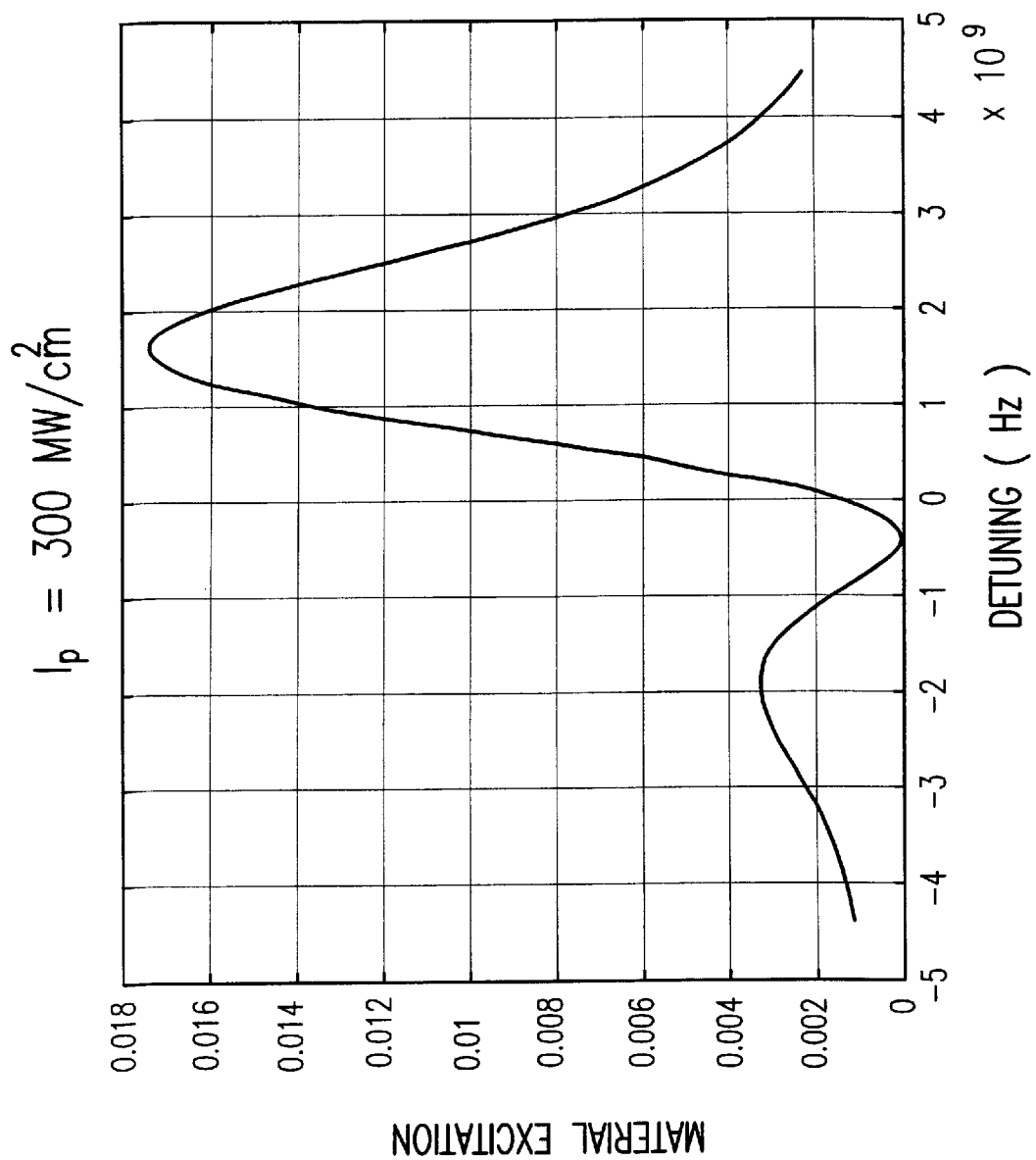

The simulations in FIG. 9 illustrate this progression as the intensity of the pump laser beam is increased from 30 MW/$cm^2$ in FIG. 9A, to 60 in FIG. 9B, 100 in FIG. 9C and 300 MW/$cm^2$ in FIG. 9D. In practice, the material excitation will also depend upon other factors, such as photoionization of atoms transferred to the upper atomic state. The plots in FIG. 6 were generated using the parameters of the preferred two-photon transition in atomic xenon at room temperature for 10-ns optical pulses, but other two-photon transitions in xenon and in other gases will exhibit similar behavior.

Figure 10:
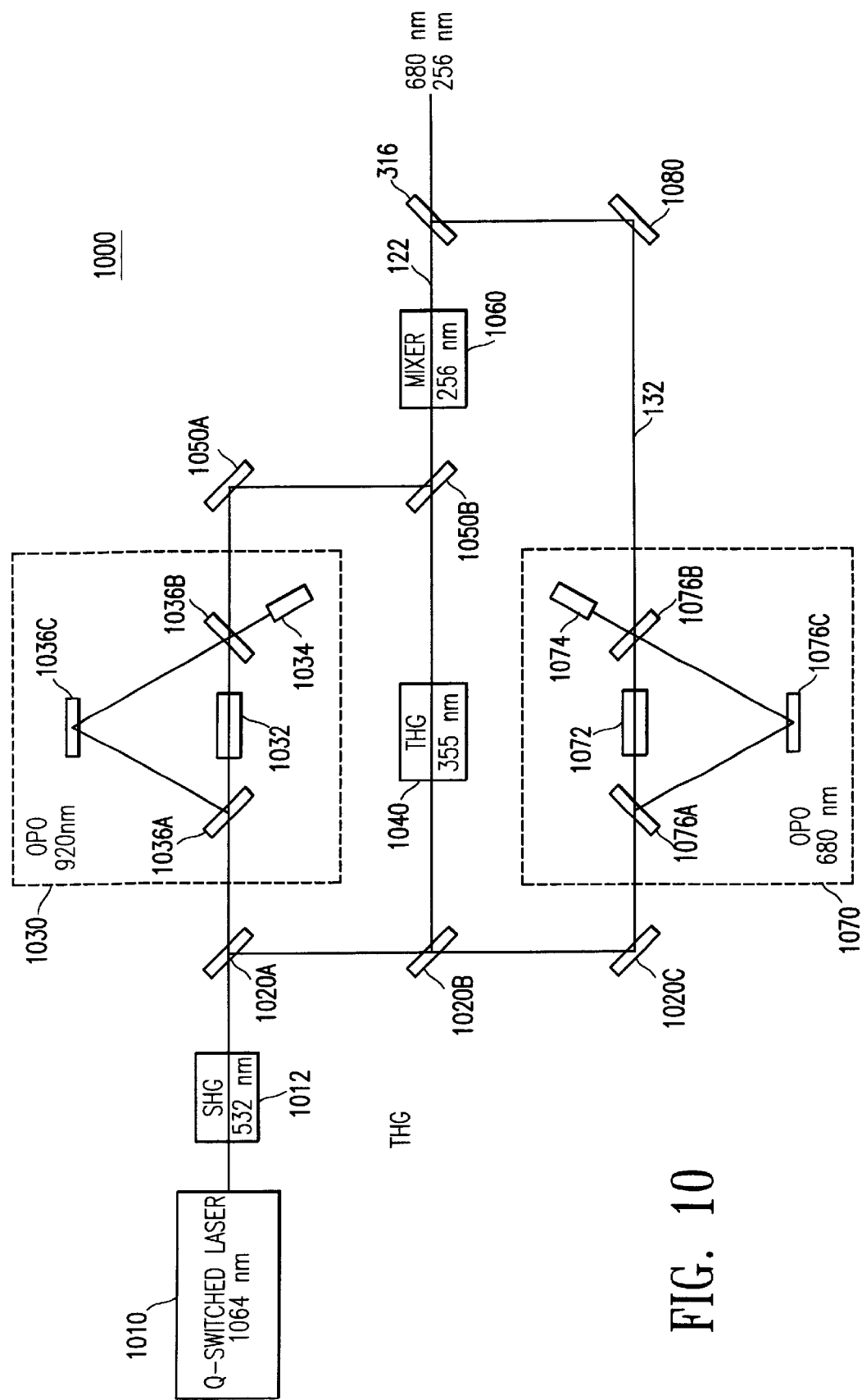
FIG. 10 is a schematic diagram of a tunable laser source suitable for use with the invention.
Figure 11:
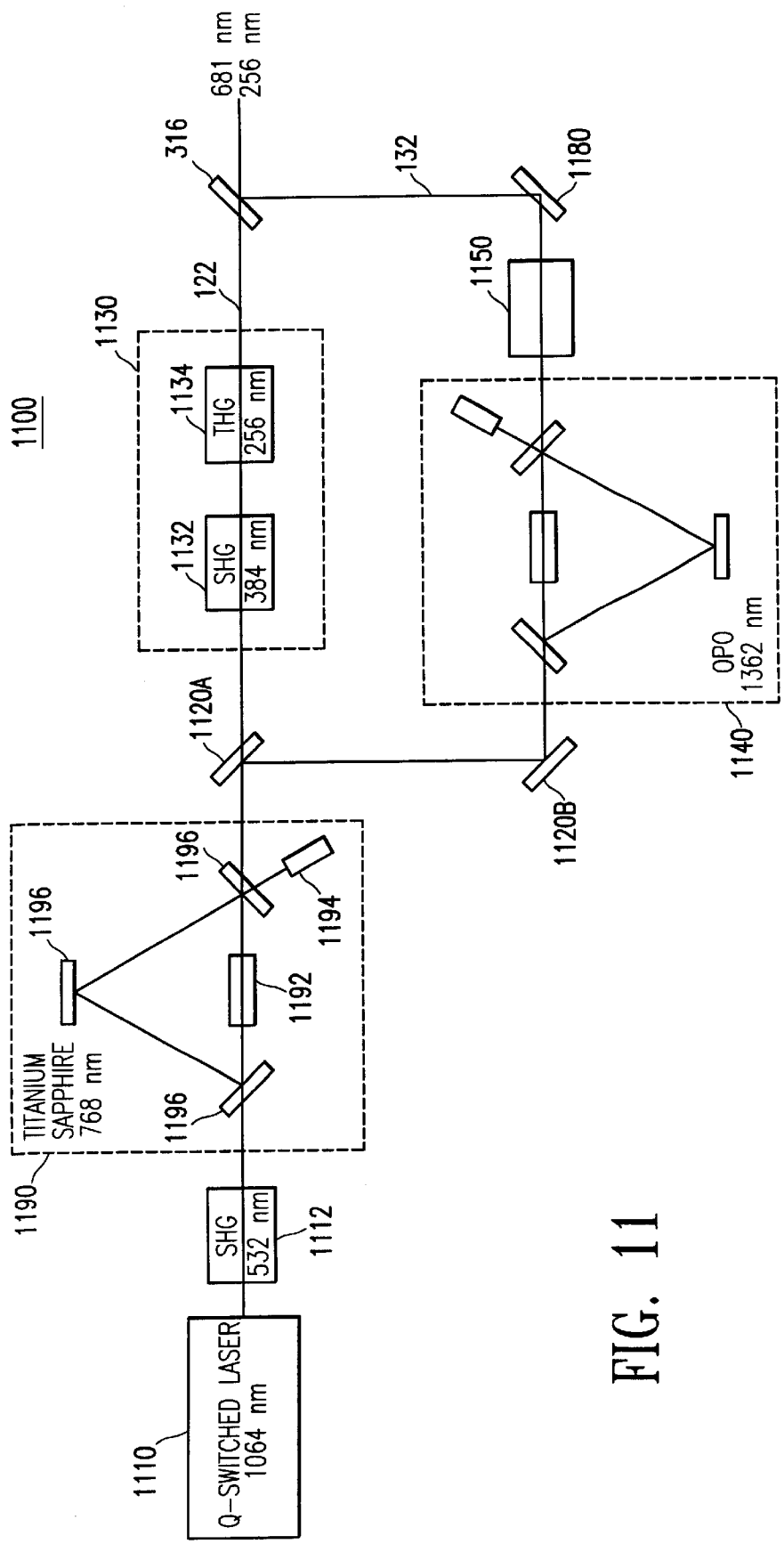
FIG. 11 is a schematic diagram of another tunable laser source suitable for use with the invention.

FIGS. 10 and 11 are schematic diagrams of example laser sources 1000, 1100 suitable for use with the invention. In both of these laser sources 1000, 1100, a single laser is used to generate both the pump laser beam 122 and the mixing laser beam 132. In other words, each of the laser sources 1000, 1100 implements both the pump laser source 120 and the mixing laser source 130. In these examples, the pump laser beam 122 has a wavelength of 256 nm and the mixing laser beam 132 has a wavelength of 681.2 nm. These wavelengths are also tunable so that the resulting VUV radiation 142 is also tunable in wavelength.

Referring first to FIG. 10, laser source 1000 includes a laser 1010, second harmonic generator 1012, mirrors 1020A–1020C, optical parametric oscillator (OPO) 1030, third harmonic generator 1040, mirrors 1050A–1050B, mixer 1060, OPO 1070 and mirror 1080. FIG. 10 also shows combining mirror 316 from FIG. 3.

Laser source 1000 operates as follows. Laser 1010 produces pulses at a wavelength of 1064 nm. Second harmonic generator 1012 uses these pulses to generate 532 nm pulses. Mirrors 1020A–1020C split the 532 nm and 1064 nm radiation into three arms. OPO 1070 is pumped by one arm to produce the mixing laser beam 132 at a wavelength of 681.2 nm. The other two arms are fed to OPO 1030 and third harmonic generator 1040. OPO 1030 generates radiation 1039 at a wavelength of 920 nm; whereas the third harmonic generator 1040 frequency triples the original 1064 nm radiation to produce a beam 1049 at a wavelength of 355 nm. The 920 nm beam and 355 nm beam are sum frequency mixed by mixer 1060 to produce the pump laser beam 122 at a wavelength of 256 nm. The combiner 316 directs the pump laser beam 122 and mixing laser beam 132 to the cell 110 (shown in FIG. 3). At these wavelengths, DFG in cell 110 generates output VUV radiation at a wavelength of 157 nm, as described in FIG. 4.

In more detail, laser 1010 is an injection-seeded Quanta Ray Pro Series Nd:YAG laser manufactured by Spectra Physics which produces 200 millijoules (mJ), 7 nanosecond (ns) pulses of coherent radiation at a wavelength of 1064 nm and at a repetition rate of approximately 10 Herz (Hz). The efficiency of the processes in OPOs 1030 and 1070, second harmonic generator 1012, third harmonic generator 1040 and mixer 1060 increases with the peak power of the pulses, so the pulses preferably should have higher peak powers as long as the peak powers are not sufficiently high to damage any of the components in the system. For pulses of constant energy, the peak power may be increased by decreasing the duration of the pulse. Laser 1010 is retrofitted with a small dot Gaussian mirror reflector to configure the pulses of coherent radiation to have a uniform mode of approximately 5 mm diameter, which in turn increases the efficiency of pumping the OPOs 1030 and 1070. The pulses preferably are free of rings, hot spots, or other irregularities, since such irregularities can degrade the performance of the system. The 1064 nm pulses from laser 1010 are frequency doubled to a wavelength of 532 nm by second harmonic generator 1012, which is a type II KTP crystal in this embodiment. The resulting beam includes both 532 nm pulses and residual 1064 nm pulses.

Mirrors 1020A–1020C split this beam into three portions which are directed towards OPO 1030, third harmonic generator 1040 and OPO 1070, respectively. The OPOs are pumped by 532 nm radiation; whereas third harmonic generator 1040 uses both 1064 nm and 532 nm radiation. Therefore, it is preferable that the mirrors are dichroic and direct more of the desired wavelength radiation to each component. For example, in one embodiment, mirror 1020A is partially transmissive at 532 nm and fully reflective at 1064 nm, mirror 1020B is partially transmissive at 532 nm and fully reflective at 1064 nm, and mirror 1020C is fully reflective at 532 nm and fully transmissive at 1064 nm (in order to dump any residual radiation at 1064 nm). In this way, the 532 nm pulses will be split between OPOs 1030 and 1070 and third harmonic generator 1040, and the 1064 nm pulses will be directed to third harmonic generator 1040.

OPO 1030 in this embodiment includes a KTP crystal 1032, mirrors 1036A–1036C, and diode seeder 1034. Mirrors 1036 form a ring cavity for OPO 1030, with KTP crystal 1032 providing the non-linearity. Mirror 1036A transmits the pump beam (at a wavelength of 532 nm); whereas mirrors 1036B–1036C are highly reflective at this wavelength. Similarly, mirror 1036B partially transmits (typ. 20–50% transmitting) the outgoing signal beam and incoming injection seed (both at a wavelength of 920 nm), and mirrors 1036A and 1036C are highly reflective at this wavelength. The diode seeder 1034 is an external cavity diode which produces a single frequency beam of continuous wave radiation at 920 nm. This beam is used to injection seed the OPO 1030, thus narrowing the linewidth of the beam 1039 produced by OPO 1030.

OPO 1030 receives the pump beam at a wavelength of 532 nm and, via the OPO process, produces two beams of radiation, the signal beam at a wavelength of 920 nm and the idler beam at a wavelength of 1262 nm. The signal beam exits the OPO 1030 as beam 1039. Since the OPO 1030 is injection seeded with a single frequency beam of radiation and since the pump beam is also single frequency, the resulting beam 1039 will also have a narrow linewidth.

Third harmonic generator 1040 is a BBO or CLBO nonlinear birefringent crystal. Crystals 1012 and 1040 together form a two stage third harmonic generator. Second harmonic generator 1012 receives 1064 nm pulses and generates 532 nm pulses from them. Third harmonic generator 1040 receives both 532 nm and 1064 nm pulses and effectively sum frequency mixes them to generate 355 nm pulses (beam 1049).

Mirrors 1050A–1050B combine the 902 nm pulses 1039 and 355 nm pulses 1049. The mirrors 1050, especially mirror 1050B, preferably are dichroic in order to increase overall efficiency.

Mixer 1060 in this embodiment is a type I BBO or CLBO crystal. The BBO or CLBO crystal implements sum frequency mixing, producing the pump laser beam 122 at a wavelength of 256 nm. A wavelength selective device (not shown in FIG. 10) may be used to eliminate unwanted wavelengths which are present in the output of the mixer 1060. A Pellin-Broca prism preferably is used for this purpose, in which case the pump laser beam 122 is preferably horizontally polarized because this simplifies the corresponding implementation details.

OPO 1070 is similar to OPO 1030. The OPO 1070 is also a ring configuration with a KTP crystal 1072, mirrors 1076A–1076C, and diode seeder 1074. The major difference is that the diode seeder 1074 generates an injection seed at a wavelength of 681.2 nm. As a result, the signal beam for the OPO 1070 has a wavelength of 681.2 nm and the idler beam has a wavelength of 2444 nm. The output of OPO 1070 is the signal beam, which serves as the mixing laser beam 132 at the wavelength 681.2 nm. Mirror 1080 redirects the mixing laser beam 132 to combiner 316.

Referring now to FIG. 11, laser source 1100 includes a pump laser 1110, second harmonic generator 1112, signal laser 1190, mirror 1120A–1120B, third harmonic generator 1130, OPO 1140, second harmonic generator 1150 and mirror 1180. Mirror 316 is also shown in FIG. 11.

Laser source 1100 operates as follows. Laser 1110 and second harmonic generator 1112 are similar to laser 1010 and second harmonic generator 1012 of FIG. 10. Together, they generate coherent radiation at a wavelength of 532 nm.

Signal laser 1190 is a titanium sapphire laser with a ring cavity. The configuration is similar to OPOs 1030 and 1070. The laser 1190 includes titanium sapphire 1192 as the nonlinear element, mirrors 1196 which form a ring cavity, and diode seeder 1194. The 532 nm radiation exiting second harmonic generator 1112 pumps the titanium sapphire 1192. The diode seeder 1194 seeds the ring cavity with 768 nm radiation. As a result, signal laser 1190 generates coherent radiation at a wavelength of 768 nm.

Mirrors 1120A–1120B split the 768 nm radiation into two arms. One arm is frequency tripled by third harmonic generator 1130, to produce the pump laser beam 122 at a wavelength of 256 nm. The third harmonic generator 1130 is implemented using two stages 1132 and 1134. The first stage 1132 includes a second harmonic generator, and the second stage 1134 includes a third harmonic generator. In one embodiment, Type I BBO crystals are used for both stages.

The other arm of 768 nm radiation pumps OPO 1140, which generates radiation at a wavelength of 1362 nm. OPO 1140 operates similarly to OPOs 1030 and 1070, except that the diode seeder 1144 operates at a wavelength of 1362 nm. This radiation is frequency doubled by second harmonic generator 1150, typically a KTP nonlinear crystal, generating the mixing laser beam 132 at a wavelength of 681.2 nm. The combiner 316 directs the pump laser beam 122 and mixing laser beam 132 to cell 110, where DFG generates output VUV radiation at a wavelength of 157 nm, as described in FIG. 4.

It should be understood that the systems shown are exemplary only and other embodiments will be apparent. For example, in systems 1000 and 1100, Nd:Ylf (at a wavelength of 1047 or 1053 nm), Nd:YVO4 (at a wavelength of 1064 nm), or Yb:YAG (tunable around the wavelength of 1030 nm) lasers could be used in place of Nd:YAG lasers 1110 or 1110. Injection seeding by diode seeders may not be necessary and/or may be achieved by devices other than diode seeders. Second and third harmonic generators may be based on any number of materials, including for example BBO and lithium triborate (LBO). The pump and mixing laser beams 122, 132 may be derived from a common laser, as shown in FIGS. 10 and 11, or may be derived from separate lasers as depicted in FIG. 3. The signal laser 1190 may be based on a Titanium-doped sapphire crystal or an Alexandrite crystal, for example.

As further examples, the cavity design of the OPOs and signal laser 1190 need not be a ring configuration. They may be a linear configuration instead. Wavelength-selective elements, such as gratings or prisms, may be introduced into the cavities to narrow the linewidth of the beams produced. Non-linear materials could be based on potassium titanyl arsenate (KTA), cesium titanyl arsenate (CTA), periodically poled materials such as periodically poled lithium tantalate, or others. Alternatively, the OPOs may be replaced by an optically pumped laser and/or optically pumped laser 1190 may be replaced by an OPO.

Wavelength filtering and selection was achieved primarily by dichroic mirrors. Other wavelength selective components, such as prisms, gratings and filters, may be used. Similarly, technologies other than mirrors may be used to split and combine various laser beams.

The systems shown have been described primarily in the context of specific fixed wavelengths. For example, systems 1000 and 1100 are described in the context of a pump laser beam 122 of wavelength 256 nm, a mixing laser beam 132 of wavelength 681.2 nm, and an output VUV beam 142 of wavelength 157.63 nm. In fact, the wavelength of the output VUV radiation 142 preferably is tunable, most commonly by tuning the wavelength of the pump laser beam 122 and/or that of the mixing laser beam 132. In a preferred embodiment, the mixing laser beam 132 is tunable in wavelength but the pump laser beam 122 is held at a constant wavelength. Phase matching depends only weakly on the wavelength of the mixing laser beam 132 (since both it and the generated VUV radiation are far from resonance), so holding the pump laser beam 122 at a constant wavelength allows efficient generation of VUV radiation 142 over a significant wavelength range without change to the Hg phase matching agent pressure or temperature. The wavelength of the VUV radiation 142 is selected by tuning the wavelength of the mixing laser beam 132.

In a preferred embodiment of the Xe/Hg system, the wavelength of the pump laser beam 122 is held constant at 256 nm. Tuning the mixing laser beam 132 over a wavelength range of 993 nm–354 nm then yields a tunable wavelength range of 147 nm–200 nm for the output VUV radiation 142 using the DFG process. At the 147 nm end of the range (i.e., 993 nm mixing wavelength), other xenon resonances come into play. At the other end, 200 nm uses a mixing wavelength of 354 nm, which is the third harmonic of 1064 nm. Similarly, tuning the mixing laser beam 132 over a wavelength range of 500 nm–3000 nm yields a tunable wavelength range of 102 nm–122 nm for the SFG process. At the 102 nm end of the range, ionization of xenon comes into play. At the 122 nm end (3000 nm mixing wavelength), the wavelength of the mixing laser beam becomes long.

These two ranges cover a range around the two specific wavelengths of interest: 157.63 nm for the molecular fluorine laser and 121.57 nm for the Lyman-α hydrogen line. In addition to allowing a range of different wavelengths, tunability also allows the system to be tuned to exactly match a desired wavelength (e.g., the molecular fluorine line or Lyman-α hydrogen line). Some embodiments are tunable over narrower wavelength ranges. For example, a wavelength range of 157–158 nm or 121–122 nm is much narrower but still useful. DFG of the output of a tunable Titanium sapphire laser (approximately 768 nm) with its third harmonic (approximately 256 nm) yields a wavelength range of approximately 153–154 nm.

Tunability may be achieved in a number of ways. For example, referring to FIGS. 10 and 11, the various OPOs may be rotated to produce an outgoing beam of a different wavelength. Alternately, the diode seeders may be wavelength tunable. As a final example, the laser sources shown in FIG. 3 may simply be tunable in their own right.

As a final example, it should be understood that the invention is not limited to the specific two-photon transitions in xenon which are shown in FIGS. 4 and 5. Other two-photon resonant systems in xenon or other materials may also be used. For example, the following table lists a sampling of two-photon resonances in xenon:

| Two-photon transition in xenon | Transition energy (cm$^{-1}$) | Pump laser beam wavelength | Mixing laser beam wavelength [157.6 DFG] | Mixing laser beam wavelength [121.6 SFG] |
|---|---|---|---|---|
| 5p$^6$ $^1$S$_0$ – 5p$^5$ 6p [2 ½]$_2$ | 78120.303 | 256.0154 nm | 681.1534 nm | 2.417 μm |
| 5p$^6$ $^1$S$_0$ – 5p$^5$ 6p [0 ½]$_0$ | 80119.474 | 249.6272 nm | 599.529 nm | 4.678 μm |
| 5p$^6$ $^1$S$_0$ – 5p$^5$ 6p [1 ½]$_2$ | 79212.970 | 252.4839 nm | 633.969 nm | 3.285 μm |
| 5p$^6$ $^1$S$_0$ – 5p$^5$ 6p' [1 ½]$_2$ | 89162.880 | 224.3086 nm | 388.7487 nm | 1.448 μm |
| 5p$^6$ $^1$S$_0$ – 5p$^5$ 6p' [1 ½]$_0$ | 89860.538 | 222.5671 nm | 378.4837 nm | 1.3152 μm |

The first column identifies the specific two-photon transition. The second column lists the transition energy of that two-photon transition. The third column lists the wavelength of the pump laser beam which exactly matches the two photon resonance. The fourth column lists the wavelength for the mixing laser beam which generates VUV radiation at exactly the molecular fluorine line using DFG. The two exceptions are that in the last two rows, the VUV radiation is generated using SFG. The fifth column lists the wavelength for the mixing laser beam which generates VUV radiation at exactly the Lyman-α hydrogen line. It should be noted that the tabulated wavelengths are for exactly matching the two photon resonance and for producing VUV radiation at a specific wavelength. The actual wavelengths may be detuned from these values. Preferably, the actual wavelength of the pump laser beam will be less than one wavenumber detuned from the exactly matching wavelength. Mercury is suitable as the phase matching gas for all of the cases listed above.

The following table lists additional two photon transitions in mercury vapor. Note that mercury is used as the nonlinear gas, not the phase matching gas.

| Two-photon transition in mercury | Transition energy ($cm^{-1}$) | Pump laser beam wavelength | Mixing laser beam wavelength [157.6 DFG] | Mixing laser beam wavelength [121.6 SFG] |
|---|---|---|---|---|
| $6s^2\ ^1S_0 - 6s6d\ ^1D_2$ | 71333.182 | 280.3744 nm | 1.2668 μm | 915.419 nm |
| $6s^2\ ^1S_0 - 6s6d\ ^3D_2$ | 71396.220 | 280.1269 nm | 1.2568 μm | 920.7327 nm |
| $6s^2\ ^1S_0 - 6s6d\ ^1D_2$ | 77064.097 | 259.5242 nm | 733.9571 nm | 1.9256 μm |
| $6s^2\ ^1S_0 - 6s6d\ ^3D_2$ | 77107.917 | 259.3767 nm | 731.604 nm | 1.942 μm |
| $6s^2\ ^1S_0 - 6s8s\ ^1S_0$ | 74404.590 | 268.8 nm | 911.9704 nm | 1.2735 μm |
| $6s^2\ ^1S_0 - 6s9s\ ^1S_0$ | 78404.387 | 255.088 nm | 668.223 nm | 2.596 μm |

The third and fourth rows of the mercury table list cases in which the pump laser beam is approximately equal to the third harmonic of the mixing laser beam. In other words, if the third harmonic of the mixing laser beam were used as the pump laser beam, the resulting VUV radiation would be approximately at the molecular fluorine wavelength for DFG processes or approximately at the Lyman-α hydrogen line for SFG processes. When mercury is used as the nonlinear gas, xenon can be used for phase matching.

Although the invention has been described in considerable detail with reference to certain preferred embodiments thereof, other embodiments are possible. Therefore, the scope of the appended claims should not be limited to the description of the preferred embodiments contained herein.

What is claimed is:

1. A nonlinear optical mixer for producing coherent vacuum ultraviolet radiation, the nonlinear optical mixer comprising:
   a cell containing a gas mixture of xenon gas and a phase-marching gas, wherein the phase-matching gas is mercury vapor;
   a pump laser source for generating a pump laser beam directed towards the gas mixture, wherein a sum of two photons from the pump laser beam preferentially excites a two-photon transition in the xenon gas; and
   a mixing laser source for generating a mixing laser beam directed towards the gas mixture, wherein coherent vacuum ultraviolet radiation is produced by the four wave mixing of a photon from the mixing laser beam with the two photons from the pump laser beam; the gas mixture achieves phase matching of the four wave mixing; and the coherent vacuum ultraviolet radiation has a wavelength of approximately 157.6 nm if the coherent vacuum ultraviolet radiation is produced by difference frequency generation or a wavelength of approximately 121.6 nm if the coherent vacuum ultraviolet radiation is produced by sum frequency generation.

2. The nonlinear optical mixer of claim 1 wherein the pump laser beam and the mixing laser beam are loosely-focused, and spatially and temporally overlapping over a region where the four wave mixing occurs.

3. The nonlinear optical mixer of claim 2 wherein the coherent vacuum ultraviolet radiation is produced by difference frequency generation and a ratio of xenon atoms to mercury atoms lies in the range of 5:1 to 7:1.

4. The nonlinear optical mixer of claim 2 wherein the coherent vacuum ultraviolet radiation is produced by sum frequency generation and a ratio of xenon atoms to mercury atoms lies in the range of 1.5:1 to 2.5:1.

5. The nonlinear optical mixer of claim 2 wherein the xenon gas is at a pressure of less than 100 Torr.

6. The nonlinear optical mixer of claim 1 wherein:
   the mixing laser beam is tunable in wavelength; and
   the coherent vacuum ultraviolet radiation is tunable over a wavelength range around 157.6 or 121.6 nm, respectively.

7. The nonlinear optical mixer of claim 6 wherein the coherent vacuum ultraviolet radiation is produced by difference frequency generation and is tunable over a wavelength range not greater than 147–200 nm by tuning the wavelength of the mixing laser beam over a wavelength range not greater than 993 nm–354 nm.

8. The nonlinear optical mixer of claim 6 wherein the coherent vacuum ultraviolet radiation is produced by sum frequency generation and is tunable over a wavelength range not greater than 102–122 nm by tuning the wavelength of the mixing laser beam over a wavelength range not greater than 500 nm–3000 nm.

9. The nonlinear optical mixer of claim 1 wherein the coherent vacuum ultraviolet radiation has a wavelength equal to a wavelength of radiation produced by a molecular fluorine laser.

10. The nonlinear optical mixer of claim 1 wherein the coherent vacuum ultraviolet radiation has a wavelength equal to a Lyman-α wavelength of atomic hydrogen.

11. The nonlinear optical mixer of claim 1 wherein the coherent vacuum ultraviolet radiation has a wavelength equal to a Lyman-α wavelength of atomic deuterium.

12. The nonlinear optical mixer of claim 1 wherein the coherent vacuum ultraviolet radiation has a wavelength equal to a Lyman-α wavelength of atomic tritium.

13. The nonlinear optical mixer of claim 1 wherein the two-photon transition in xenon is the transition between the $5p^6\ ^1S_0$ and $5p^5\ 6p\ [2½]_2$ atomic states.

14. The nonlinear optical mixer of claim 1 wherein the pump laser source and the mixing laser source together comprise:
   a laser for generating a source laser beam;
   a nonlinear crystal positioned to generate a third harmonic of the source laser beam,
      wherein the third harmonic serves as the pump laser beam and the source laser beam serves as the mixing laser beam.

15. The nonlinear optical mixer for producing coherent vacuum ultraviolet radiation, the nonlinear optical mixer comprising:
   a cell containing a gas mixture of xenon gas and a phase-matching gas;
   a laser for generating laser pulses at a wavelength of approximately 1064 nm;
   a second harmonic generator coupled to the laser for frequency doubling the 1064 nm laser pulses to generates laser pulses at a wavelength of approximately 532 nm;
   a splitter coupled to the second harmonic generator for splitting pulses into three arms;

a first optical parametric oscillator (OPO) coupled to receive a first arm for generating radiation at a wavelength of approximately 920 nm;

a third harmonic generator coupled to receive a second arm for generating a third harmonic of the 1064 nm pulses at a wavelength of approximately 355 nm;

a mixer coupled to the first OPO and the third harmonic generator for sum frequency mixing the 920 nm radiation and the 355 nm radiation to generate the pump laser beam at a wavelength of approximately 256 nm, wherein the pump laser beam is directed towards the gas mixture and sum of two photons from the pump laser beam preferentially excites a two-photon transition in the xenon gas; and a second OPO coupled to receive a third arm for generating a mixing laser beam at a wavelength of approximately 681.2 nm, wherein the mixing laser beam is directed towards the gas mixture and coherent vacuum ultraviolet radiation is produced by the four wave mixing of a photon from the mixing laser beam with the two photons from the pump laser beam; the gas mixture achieves phase matching of the four wave mixing; and the coherent vacuum ultraviolet radiation has a wavelength of approximately 157.6 nm if the coherent vacuum ultraviolet radiation is radiation is produced by difference frequency or a wavelength of approximately 121.6 nm if the coherent vacuum ultraviolet radiation is produced by sum frequency generation.

16. A nonlinear optical mixer for producing coherent vacuum ultraviolet radiation, the nonlinear optical mixer comprising:

a cell containing a gas mixture of xenon gas and a phase-matching gas;

a laser source for generating laser pulses at a wavelength of approximately 768 nm;

a splitter coupled to the laser source for splitting the laser pulses into two arms;

a third harmonic generator coupled to receive a first arm for generating a third harmonic of the 768 nm pulses at a wavelength of approximately 256 nm, wherein the 256 nm pulses serve as a pump laser beam directed towards the gas mixture and a sum of two photons front the pump laser beam preferentially excites a two-photon transition in the xenon gas;

an optical parametric oscillator (OPO) coupled to receive a second arm for generating radiation at a wavelength of approximately 1362 nm; and a second harmonic generator coupled to the OPO for generating a second harmonic of the 1362 nm pulses at a wavelength of approximately 681.2 nm, wherein the 681.2 nm pulses serve as a mixing laser beam directed towards the gas mixture and coherent vacuum ultraviolet radiation is produced by the four wave mixing of a photon from the mixing laser beam with the two photons from the pump laser beam; the gas mixture achieves phase matching of the four wave mixing; and the coherent vacuum ultraviolet radiation has a wavelength of approximately 157.6 nm if the coherent vacuum ultraviolet radiation is produced by difference frequency generation or a wavelength of approximately 121.6 nm if the coherent vacuum ultraviolet radiation is produced by sum frequency generation.

17. The nonlinear optical mixer of claim 1 wherein the pump laser beam and the mixing laser beam each has an intensity of less than 100 MW/cm$^2$.

18. The nonlinear optical mixer of claim 1 wherein the sum of the two photons from the pump laser beam is within 5 GHz of the two-photon transition in xenon.

19. A method for producing coherent vacuum ultraviolet radiation, the method comprising:

providing a cell containing a gas mixture of xenon gas and a phase-marching gas, wherein the phase-matching gas is mercury vapor;

directing simultaneously a pump laser beam and a mixing laser beam towards the gas mixture, wherein a sum of two photons from the pump laser beam preferentially excites a two-photon transition in the xenon gas; and four wave mixing a photon from the mixing laser beam with the two photons from the pump laser beam to produce the coherent vacuum ultraviolet radiation, wherein the gas mixture achieves phase matching of the four wave mixing, and the coherent vacuum ultraviolet radiation has a wavelength of approximately 157.6 nm if the coherent vacuum ultraviolet radiation is produced by difference frequency generation or a wavelength of approximately 121.6 nm if the coherent vacuum ultraviolet radiation is produced by sum frequency generation.

20. The method of claim 19 wherein the pump laser beam and the mixing laser beam are loosely-focused, and spatially and temporally overlapping over a region where the four wave mixing occurs.

21. The method of claim 20 wherein the coherent vacuum ultraviolet radiation is produced by difference frequency generation and a ratio of xenon atoms to mercury atoms lies in the range of 5:1 to 7:1.

22. The method of claim 20 wherein the coherent vacuum ultraviolet radiation is produced by sum frequency generation and a ratio of xenon atoms to mercury atoms lies in the range of 1.5:1 to 2.5:1.

23. The method of claim 21 wherein the xenon gas is at a pressure of less than 100 Torr.

24. The method of claim 19 further comprising:

tuning a wavelength of the mixing laser beam in order to tune a wavelength of the coherent vacuum ultraviolet radiation over a wavelength range around 157.6 or 121.6 nm, respectively.

25. The method of claim 24 wherein the coherent vacuum ultraviolet radiation is produced by difference frequency generation and tuning the wavelength of the mixing laser beam over a wavelength range not greater than 993 nm–354 nm tunes the wavelength of the coherent vacuum ultraviolet radiation over a range not greater than 147–200 nm.

26. The method of claim 24 wherein the coherent vacuum ultraviolet radiation is produced by sum frequency generation and tuning the wavelength of the mixing laser beam over a wavelength range not greater than 500 nm–3000 nm tunes the wavelength of the coherent vacuum ultraviolet radiation over a range not greater than 102–122 nm.

27. The method of claim 18 wherein the coherent vacuum ultraviolet radiation has a wavelength equal to a wavelength of radiation produced by a molecular fluorine laser.

28. The method of claim 19 wherein the coherent vacuum ultraviolet radiation has a wavelength equal to a Lyman-α wavelength of atomic hydrogen.

29. The method of claim 19 wherein the coherent vacuum ultraviolet radiation has a wavelength equal to a Lyman-α wavelength of atomic deuterium.

30. The method of claim 19 wherein the coherent vacuum ultraviolet radiation has a wavelength equal to a Lyman-α wavelength of atomic tritium.

31. The method of claim 19 wherein the two-photon transition in xenon is the transition between the $5p^6\ {}^1S_0$ and $5p^5\ 6p\ [2\frac{1}{2}]_2$ atomic states.

32. The method of claim 19 further comprising:
generating a source laser beam; and
generating a third harmonic of the source laser beam, wherein the third harmonic serves as the pump laser beam and the source laser beam serves as the mixing laser beam.

33. The method of claim 19 wherein the pump laser beam and the mixing laser beam each has an intensity of less than 100 MW/cm$^2$.

34. The method of claim 19 wherein the sum of the two photons from the pump laser beam is within 5 GHz of the two-photon transition in xenon.

* * * * *

UNITED STATES PATENT AND TRADEMARK OFFICE
CERTIFICATE OF CORRECTION

PATENT NO. : 6,525,868 B2
DATED : February 25, 2003
INVENTOR(S) : Andrew J. Merriam and James J. Jacob It is certified that error appears in the above-identified patent and that said Letters Patent is hereby corrected as shown below:

Title page,
Item [56], References Cited, U.S. PATENT DOCUMENTS, add:

| | | | |
|---|---|---|---|
| -- 3,795,819A | 03/1974 | Harris | ....... 307/ 88.3 |
| 3,816,754A | 06/1974 | Hodgson et al. | ....... 307/ 88.3 |
| 3,914,618A | 10/1975 | Harris | ....... 307/ 88.3 |
| 4,058,739A | 11/1977 | Bjorkholm et al. | ....... 307/ 88.3 |
| 4,529,944A | 07/1985 | Glownia et al. | ....... 330/ 4.3 |
| 5,771,117A | 06/1998 | Harris et al. | ....... 359/ 326 |
| 6,088,379A | 07/2000 | Owa et al. | ....... 372/ 97 |
| 6,229,828 B1 | 05/2001 | Sanders et al. | ....... 372/ 22 |
| 6,249,371 B1 | 06/2001 | Masuda et al. | ....... 359/ 326 -- |

OTHER PUBLICATIONS, add:
-- Bjorklund, Gary, "Effects of Focusing on Third-Order Nonlinear Processes in Isotropic Media," IEEE Journal of Quantum Electronics (1975), Vol. QE-11, No. 6, pages 287-296.
Bokor, J., et al., "Generation of high-brightness coherent radiation in the vacuum ultraviolet by four-wave parametric oscillation in mercury vapor, "Optics Letters (1981), Vol. 6, No. 4, pages 182-184.
Boyd, Robert, et al., "Competition between amplified spontaneous emission and the four-wave mixing process," Physical Review A (1987), Vol. 35, No. 4, pages 1648-1658.
Castex, Marie-Claude, "Experimental determination of the lowest excited $Xe_2$ molecular states from VUV absorption spectra," Journal of Chemical Physics (1981), Vol. 74, No. 2, pages 759-771.
Castex, Marie-Claude, "High resolution spectrum of the Xenon molecule in the vacuum ultraviolet region (1150-1300A)," Chemical Physics 5 (1974), pages 448-455.
Hilbig, R., et al., "Narrowband tunable VUV radiation generated by nonresonant sum- and difference-frequency mixing in xenon and krypton," Applied Optics (1982), Vol. 21, No. 5, pages 913-917.

UNITED STATES PATENT AND TRADEMARK OFFICE
CERTIFICATE OF CORRECTION

PATENT NO. : 6,525,868 B2
DATED : February 25, 2003
INVENTOR(S) : Andrew J. Merriam and James J. Jacob It is certified that error appears in the above-identified patent and that said Letters Patent is hereby corrected as shown below:

OTHER PUBLICATIONS, cont'd,
Hilbig, R., et al., "Tunable VUV Radiation Generated by Two-Photon Resonant Frequency Mixing in Xenon," IEEE Journal of Quantum Electronics (1983), Vol. QE-19, No. 2, pages 194-201.
Mahon, Rita, et al., "Frequency Up-Conversion to the VUV in Hg Vapor," Journal of Quantum Electronics (1982), Vol. QE-18, No. 5, pages 913-920.
Mahon, Rita, et al., "Third-Harmonic Generation in Argon, Krypton, and Xenon: Bandwidth Limitations in the Vicinity of Lyman-α," IEEE Journal of Quantum Electronics (1979), Vol. QE-15, No. 6, pages 444-451.
Miles, Richard, et al., "Optical Third Harmonic Generation in Alkali Metal Vapors," IEEE Journal of Quantum Electronics (1973), Vol. QE-9, No. 4, pages 470-484.
Muller III, C.H., et al., "High-efficiency, energy-scalable, coherent 130-nm source by four-wave mixing in Hg vapor," Optics Letters (1988), Vol. 13, No. 8, pages 651-653.
Smith, A.V., et al., "Optimization of two-photon-resonant four-wave mixing: application to 130.2-nm generation in mercury vapor," Journal of the Optical Society of America B (1988), Vol. 5, No. 7, pages 1503-1519. --

Column 17,
Line 47, please replace "phase-marching" with -- phase-matching --.

Column 18,
Line 55, please replace "The nonlinear optical" with -- A nonlinear optical --.

Column 19,
Line 13, please insert -- a -- between "and" and "sum".
Line 24, please delete "is radiation" so that the line reads -- vacuum ultraviolet radiation is produced by --.
Line 25, please insert -- generation -- between "frequency" and "or".
Line 41, please replace "front" with -- from --.

UNITED STATES PATENT AND TRADEMARK OFFICE
CERTIFICATE OF CORRECTION

PATENT NO. : 6,525,868 B2
DATED : February 25, 2003
INVENTOR(S) : Andrew J. Merriam and James J. Jacob It is certified that error appears in the above-identified patent and that said Letters Patent is hereby corrected as shown below:

Column 20,
Line 4, please replace "phase-marching" with -- phase-matching --.
Line 55, please replace "claim 18" with -- claim 19 --.

Signed and Sealed this

Nineteenth Day of August, 2003

JAMES E. ROGAN
*Director of the United States Patent and Trademark Office*